United States Patent
Banu et al.

(10) Patent No.: US 10,574,432 B2
(45) Date of Patent: Feb. 25, 2020

(54) ACTIVE ARRAY CALIBRATION

(71) Applicant: Blue Danube Systems, Inc., Warren, NJ (US)

(72) Inventors: Mihai Banu, New Providence, NJ (US); Yiping Feng, Skillman, NJ (US)

(73) Assignee: Blue Danube Systems, Inc., Warren, NJ (US)

( * ) Notice: Subject to any disclaimer, the term of this patent is extended or adjusted under 35 U.S.C. 154(b) by 0 days.

(21) Appl. No.: 16/277,073

(22) Filed: Feb. 15, 2019

(65) Prior Publication Data
US 2019/0182023 A1 Jun. 13, 2019

Related U.S. Application Data

(62) Division of application No. 15/259,265, filed on Sep. 8, 2016, now Pat. No. 10,225,067.
(Continued)

(51) Int. Cl.
*H01Q 21/00* (2006.01)
*H04L 7/00* (2006.01)
(Continued)

(52) U.S. Cl.
CPC ........... *H04L 7/0016* (2013.01); *H01Q 1/241* (2013.01); *H01Q 21/24* (2013.01); *H04B 1/0458* (2013.01);
(Continued)

(58) Field of Classification Search
CPC ........ H01Q 21/00; H01Q 1/241; H01Q 21/24; H04B 17/364; H04L 7/0016
(Continued)

(56) References Cited

U.S. PATENT DOCUMENTS

| 2,225,928 A | 12/1940 | Ring |
| 3,229,204 A | 1/1966 | Barry |

(Continued)

FOREIGN PATENT DOCUMENTS

| CN | 102955155 | 3/2013 |
| CN | 106455245 | 2/2017 |

(Continued)

OTHER PUBLICATIONS

U.S. Appl. No. 15/448,744, filed Mar. 3, 2017, Banu et al.

*Primary Examiner* — Huedung X Mancuso
(74) *Attorney, Agent, or Firm* — Occhiuti & Rohlicek LLP

(57) ABSTRACT

A method of calibrating a phased array including an array of antenna elements, RF communication circuits each of which is electrically coupled to a different corresponding antenna element within the array of antenna elements, and a signal feed network that electrically couples a first signal line to second signal lines, wherein each second signal line is electrically coupled to a different corresponding RF communication circuit among the RF communication circuits, the method involving: performing a first phase of a calibration operation, the first phase of the calibration operation involving calibrating the signal feed network independent of the RF communication circuits; and performing a second phase of the calibration operation, the second phase of the calibration operation involving calibrating, independent of the signal feed network, each of the RF communication circuits until all RF communication circuits among the RF communication circuits are calibrated.

18 Claims, 24 Drawing Sheets

Related U.S. Application Data

(60) Provisional application No. 62/216,592, filed on Sep. 10, 2015.

(51) Int. Cl.

| | | |
|---|---|---|
| *H01Q 21/24* | (2006.01) | |
| *H01Q 1/24* | (2006.01) | |
| *H04B 1/04* | (2006.01) | |
| *H04B 1/18* | (2006.01) | |
| *H04B 17/364* | (2015.01) | |
| *H04L 7/033* | (2006.01) | |
| *H04L 5/00* | (2006.01) | |
| *H04B 17/00* | (2015.01) | |

(52) U.S. Cl.
CPC ............ *H04B 1/18* (2013.01); *H04B 17/364* (2015.01); *H04L 5/0048* (2013.01); *H04L 7/033* (2013.01); *H04B 17/00* (2013.01)

(58) Field of Classification Search
USPC ........................................................ 343/893
See application file for complete search history.

(56) References Cited

U.S. PATENT DOCUMENTS

| | | | |
|---|---|---|---|
| 4,879,519 A | 11/1989 | Myer | |
| 5,298,866 A | 3/1994 | Kaplinsky | |
| 5,361,277 A | 11/1994 | Grover | |
| 5,412,414 A | 5/1995 | Ast et al. | |
| 5,712,883 A | 1/1998 | Miller | |
| 5,732,333 A | 3/1998 | Cox | |
| 5,995,062 A | 11/1999 | Denney | |
| 6,005,515 A | 12/1999 | Allen | |
| 6,157,343 A | 12/2000 | Andersson et al. | |
| 6,281,936 B1 | 8/2001 | Twitchell | |
| 6,339,399 B1 | 1/2002 | Andersson | |
| 6,388,513 B1 | 5/2002 | Wright | |
| 6,448,939 B2 | 9/2002 | Maruta | |
| 6,459,334 B2 | 10/2002 | Wright | |
| 6,466,160 B2 | 10/2002 | Rexberg | |
| 6,563,358 B1 | 5/2003 | Goulette | |
| 6,624,784 B1 | 9/2003 | Yamaguchi | |
| 6,647,506 B1 | 11/2003 | Yang | |
| 6,697,436 B1 | 2/2004 | Wright | |
| 6,806,844 B2 | 10/2004 | Azuma | |
| 6,950,631 B2 | 9/2005 | Solbach | |
| 6,993,301 B1 | 1/2006 | Kenington | |
| 7,031,669 B2 | 4/2006 | Vaidyanathan | |
| 7,199,753 B2* | 4/2007 | Pauplis ................. H01Q 3/267 342/174 |
| 7,230,570 B2 | 6/2007 | Thomas | |
| 7,236,750 B2 | 6/2007 | Vaidyanathan | |
| 7,317,428 B2 | 1/2008 | Bolle | |
| 7,439,901 B2 | 10/2008 | Needham | |
| 7,466,252 B1 | 12/2008 | Radulov | |
| 7,580,686 B2 | 8/2009 | Fonden | |
| 7,671,799 B1 | 3/2010 | Paek | |
| 7,764,935 B2 | 7/2010 | Pallonen | |
| 7,876,261 B1 | 1/2011 | Adams | |
| 8,013,783 B2 | 9/2011 | Alexander et al. | |
| 8,041,306 B2 | 10/2011 | Behzad | |
| 8,045,926 B2 | 10/2011 | Martikkala | |
| 8,077,083 B2 | 12/2011 | Blake | |
| 8,094,748 B2 | 1/2012 | Netsell | |
| 8,102,785 B2 | 1/2012 | Rao | |
| 8,154,452 B2 | 4/2012 | Webb | |
| 8,208,963 B2 | 6/2012 | Codreanu | |
| 8,259,884 B2 | 9/2012 | Banu et al. | |
| 8,294,516 B2 | 10/2012 | Young | |
| 8,311,166 B2* | 11/2012 | Kenington ............ H04B 17/21 370/334 |
| 8,351,543 B2 | 1/2013 | Kenington | |
| 8,477,871 B2 | 7/2013 | Neumann | |
| 8,553,826 B2 | 10/2013 | Banu et al. | |
| 8,611,959 B2 | 12/2013 | Banu et al. | |
| 8,618,983 B2 | 12/2013 | Chen | |
| 8,665,141 B2 | 3/2014 | Haakan et al. | |
| 8,665,931 B2 | 3/2014 | Afsahi | |
| 8,731,005 B2 | 5/2014 | Schlee | |
| 8,754,811 B1 | 6/2014 | Uscinowicz | |
| 8,836,578 B2 | 9/2014 | Kenington | |
| 8,897,717 B2 | 11/2014 | Ferguson | |
| 9,118,113 B2 | 8/2015 | Mortazawi | |
| 9,137,070 B2 | 9/2015 | Beukema | |
| 9,300,408 B2* | 3/2016 | Katipally ............... H01Q 3/267 |
| 9,391,565 B2 | 7/2016 | Baker et al. | |
| 9,444,559 B2 | 9/2016 | Hong et al. | |
| 2001/0007446 A1* | 7/2001 | Amano ..................... H01Q 1/50 343/860 |
| 2005/0069026 A1 | 3/2005 | Vepsalainen | |
| 2008/0080660 A1 | 4/2008 | Rofougaran | |
| 2011/0001660 A1 | 1/2011 | Ray | |
| 2011/0122016 A1 | 5/2011 | Lomes et al. | |
| 2011/0151806 A1 | 6/2011 | Kenington | |
| 2012/0050107 A1* | 3/2012 | Mortazawi ............... H01Q 3/30 342/372 |
| 2012/0139776 A1* | 6/2012 | Malmqvist ............ H01Q 3/267 342/174 |
| 2012/0258754 A1 | 10/2012 | Banu et al. | |
| 2013/0260844 A1* | 10/2013 | Rucki .................... H01Q 1/246 455/575.7 |
| 2013/0265203 A1* | 10/2013 | Ermutlu ............... H01Q 9/0457 343/703 |
| 2014/0184445 A1 | 7/2014 | Desclos et al. | |
| 2014/0266432 A1 | 9/2014 | Scott et al. | |
| 2015/0035606 A1 | 2/2015 | Bartram | |
| 2015/0087247 A1* | 3/2015 | Matsuno .................. H03L 5/02 455/78 |
| 2017/0078081 A1 | 3/2017 | Banu et al. | |
| 2017/0180110 A1 | 6/2017 | Banu | |

FOREIGN PATENT DOCUMENTS

| | | |
|---|---|---|
| EP | 1295417 | 3/2003 |
| EP | 2372836 | 10/2011 |
| KR | 20140098690 | 8/2014 |

\* cited by examiner

ACTIVE ARRAY CALIBRATION

CROSS-REFERENCE TO RELATED APPLICATIONS

This application is a Divisional of U.S. application Ser. No. 15/259,265, filed on Sep. 8, 2016, which claims the priority filing date of U.S. Provisional Application No. 62/216,592, filed on Sep. 10, 2015. The contents of each of the above-referenced applications is incorporated herein by reference in its entirety.

TECHNICAL FIELD

Embodiments of the present invention generally relate to the calibration of active arrays, such as phased antenna arrays of the type that are used in communications systems.

BACKGROUND

Active arrays are complex electronic devices used extensively in military radars and communications. In addition, they are also found in some nonmilitary systems such as in equipment for weather forecast, space communications, and air-traffic control. In general, active arrays are very beneficial in systems where they replace critical mechanical operation with purely electrical operation. For example, the dish antenna of a conventional radar has a precise 3D geometrical design to generate a single narrow beam while an active array can generate multiple narrow beams with a planar construct. More importantly, one can change the beam direction of a dish antenna only by rotating the antenna in space appropriately but one changes the beam directions of an active array through electrical means alone without any mechanical movement. Therefore, the active array replaces mechanical beam forming and steering with electrical beam forming and steering. An important added benefit is a great increase in beam steering agility as electronic steering is substantially faster than mechanical steering. While physical laws of mechanical movement limit mechanical steering, electrical steering operates at the speed of electronic processing. The active arrays form and steer beams by phase shifting and magnitude scaling coherent signals applied to multiple radiating elements.

Despite the advantages mentioned above, the use of active arrays has been limited to high-end systems due a very high cost of manufacturing. Recently, in U.S. Pat. No. 8,611,959, all of which is incorporated herein by reference, a new method for designing low-cost active arrays has been described with potential wide-ranging commercial applications in cellular system, WiFi networks, and other wireless networks. Adding such low-cost active arrays to the wireless infrastructure will enable the capability to generate high-quality communication channels via electronically steerable beams. These beams may be directed in accordance with the mobile traffic density (e.g., see U.S. Ser. No. 14/799,935, filed Jul. 15, 2015, and entitled "Method of Adaptive Beam Placement in Wireless Systems," incorporated herein by reference) or may scan the service area rapidly (e.g., see US Patent Publication 2012/0258754, entitled "Technique for Achieving High Average Spectrum Efficiency in a Wireless System, also incorporated herein by reference) to increase the network capacity significantly in both cases. This capacity boosting effect is enhanced if the beams are narrow, as generated by active arrays with a large number of elements. The narrower the beams the higher the quality of the signals exchanged between the base stations and the mobiles. Higher signal quality translates into higher network capacity. In addition, narrow beams allow frequency reuse by spatial division multiplexing, which also increases the system capacity.

A key requirement in the design of active arrays is electrical uniformity of all active elements in the array to maintain coherent and phase stable signals. Without very precise matching of the way elements respond to common electrical stimuli, it is not possible to generate or steer well-defined beams. In typical implementations in use today, high uniformity across the array is accomplished by using expensive architectures, expensive components, expensive assembly methods, and expensive calibration methods.

In order to illustrate the challenges of designing active arrays, consider a radio intended for independent operation, such as the radio inside a cell phone or of a base station. Usually, this radio is required to have excellent performance in terms of overall linearity and noise. However, the signal phase shifts due to time delays through the various radio components such as mixers, amplifiers, filters, etc. are of little relevance and can vary widely and randomly from unit to unit because they do not affect the performance of the system. In other words, if a large number of cell phone radios were tested for end-to-end signal phase shifting (signals delays), very few if any would have equal characteristics. Nevertheless, each cell phone radio works correctly as a single radio. Even the overall gain characteristic of the radio may vary moderately without a major loss in system performance.

The case of an active array is fundamentally different from the case above because all radios in the array must have the same overall phase and gain characteristics to a high degree of precision. This is a stringent design constraint, especially if the array must operate in wide environmental conditions, as is usually the case. Typically, in current art, the array electrical uniformity is realized by first building the radios with architectures and components, which have stable characteristics over wide environmental conditions. In addition, the array architecture includes means for adjusting the overall phase and magnitude characteristics of every array element to be able to compensate for unpredictable manufacturing and operational variations. Lastly, the array is calibrated during fabrication and often is re-calibrated at regular scheduled maintenance intervals. Re-calibration is necessary because in most cases the array electrical uniformity deteriorates slowly in time due to operation and environmental conditions.

Naturally, the design approach described above for conventional active arrays yields high manufacturing and maintenance costs. U.S. Pat. No. 8,611,959 discloses methods to design active arrays, which are significantly lower cost than conventional arrays due to their unique simplified architecture. However, the performance of even these arrays is susceptible to degradation due to manufacturing and operational variations such as temperature, humidity, and aging. Here we disclose methods to calibrate these arrays efficiently and automatically. Some of these methods can be applied without interrupting the normal operation of the array. Furthermore, these methods can be also applied to many other active arrays, including some conventional arrays such as digital arrays.

SUMMARY

Embodiments of the present invention include methods and systems for calibrating phased arrays automatically before starting normal operation and during normal operation.

In general, in one aspect, at least one of the inventions features a method of calibrating a phased array including an array of antenna elements, a plurality of RF communication circuits each of which is electrically coupled to a different corresponding antenna element within the array of antenna elements, and a signal feed network that electrically couples a first signal line to a plurality of second signal lines, wherein each second signal line of the plurality of second signal lines is electrically coupled to a different corresponding RF communication circuit among the plurality of RF communication circuits. The method involves: performing a first phase of a calibration operation, the first phase of the calibration operation involving calibrating the signal feed network independent of the plurality of RF communication circuits; and performing a second phase of the calibration operation, the second phase of the calibration operation involving calibrating, independent of the signal feed network, each of the plurality of the RF communication circuits until all RF communication circuits among the plurality of RF communication circuits are calibrated.

Other embodiments include one or more of the following features. The method also involves repeatedly performing the second phase of the calibration operation without repeating the first phase of the calibration operation. The method involves performing the second phase of the calibration operation at pre-determined time intervals or performing the second phase of the calibration operation whenever a pre-determined change in the environment of the phased array is detected. Calibrating the signal feed network involves determining a phase correction and/or a magnitude correction for each of the plurality of second signal lines and then applying the phase corrections and/or magnitude corrections for the plurality of second lines to the phased array. Calibrating each of the RF communication circuits among the plurality of RF communication circuits involves determining a phase correction and/or a magnitude correction for each of the RF communication circuits and then applying the phase corrections and/or magnitude corrections for the plurality of RF communication circuits to the phased array.

Still other embodiments include one or more of the following features. The signal feed network is a signal distribution network and each RF communication circuit among the plurality of RF communication circuits is an RF transmission circuit for driving the antenna element to which that RF communication circuit is electrically coupled. Alternatively, the signal feed network is a signal aggregation network and each RF communication circuit among the plurality of RF communication circuits is an RF receive module for processing a signal received by the antenna element to which that RF communication circuit is electrically coupled. Each RF communication circuit among the plurality of RF communication circuits includes at least one of a mixer for up-converting an IF signal received from the distribution network to RF and a mixer for down-converting an RF signal received from the antenna element coupled to that RF communication circuit to IF. During the second phase of the calibration operation, calibrating only a subset of the plurality RF communication circuit at a time, wherein each subset is at least one but less than all of the RF communication circuits among the plurality of RF communication circuits. In some embodiments, each subset includes only one RF communication circuit. During the second phase of the calibration operation, electrically disconnecting any RF communication circuit that is being calibrated from the signaling network while that RF communication circuit is being calibrated.

In general, in yet another aspect, at least one of the inventions features a phased antenna array system including: a signal feed network that electrically couples a first signal line to a plurality of second signal lines; an array of antenna elements; a plurality of RF communication circuits, each RF communication circuit of the plurality of RF communication circuits having a first port and a second port with the first port electrically connected to a different corresponding second signal line among the plurality of second signal lines of the signal feed network and the second port electrically connected to a different corresponding antenna element within the array of antenna elements; and a plurality of calibration circuits equal in number to the plurality of RF communication circuits, each electrically connected to and for calibrating, independent of the signal feed network, a different corresponding RF communication circuit among the plurality of RF communication circuits.

Other embodiments include one or more of the following features. The phased antenna array system of claim 20, further includes a plurality of switches, each of which is associated with a different RF communication circuit among the plurality of RF communication circuits and each of which is for electrically connecting and disconnecting its associated RF communication circuit from the corresponding second signal line to which that RF communication circuit is electrically connected. The phased antenna array also includes a processor system programmed to execute a calibration operation during which the processor system uses each calibration circuit to perform measurements on its connected RF communication circuit and generate calibration correction data from the measurements. The processor system is programmed to sequence through the plurality of RF communication circuits by selecting one subset of the plurality of RF communication circuits at a time and, for each selected subset of RF communication circuits, use the calibration circuits for the selected subset of RF communication circuits to calibrate the selected RF communication circuits, until all of the plurality of RF communication circuits are calibrated, and wherein each of the selected subsets includes at least one but less than all of the plurality of RF communication circuits. The processor system is also programmed to sequence through all of the plurality of RF communication circuits by selecting one of the plurality of RF communication circuits at a time and, for that selected RF communication circuit, use the calibration circuit for that selected RF communication circuit to calibrate that selected RF communication circuit, until all of the plurality of RF communication circuits are calibrated. The processor system is programmed to cause the switches to electrically disconnect each RF communication circuit of the plurality of RF communication circuit from its corresponding second signal line of the signal feed network when that RF communication circuit is being calibrated.

Still other embodiments include one or more of the following features. Each calibration circuit among the plurality of calibration circuits includes: a reference signal output line for introducing a reference signal into the RF communication circuit connected to that calibration circuit; a monitoring line for receiving from the RF communication circuit connected to that calibration circuit an output signal resulting from the reference signal introduced into that RF communication circuit; and a phase calibrating circuit for generating a phase correction for that RF communication circuit, wherein the phase correction for that calibration circuit is derived from the reference and output signals for that calibration circuit. Each calibration circuit among the plurality of calibration circuits further includes: a magnitude calibrating circuit for generating a magnitude correction for that RF communication circuit, wherein the magnitude correction for that calibration circuit is derived from the reference and output signals for that calibration circuit. Each RF communication circuit of the plurality of RF communication circuits includes: an RF mixer; RF front end circuitry electrically connected to the antenna element; phase adjusting circuitry for adjusting phase of a signal passing through that RF communication circuit; a communication signal line for carrying a communication signal between an external signaling network and that RF communication circuit; and an LO signal line for receiving a local oscillator (LO) signal for the RF mixer.

The details of one or more embodiments of the inventions are set forth in the accompanying drawings and the description below. Other features, objects, and advantages of the inventions will be apparent from the description and the drawings, and from the claims.

DETAILED DESCRIPTION

Conventional Analog Active Arrays

Typical active antenna arrays contain a plurality of antenna elements placed on a grid, which may be linear, planar, or conformal to a surface. The physical separation of the antenna elements is related to the frequency of operation of the array and very often equals half the average wavelength of the signals transmitted or received. This is necessary for the array to generate narrow beams with low side lobes. Since typical arrays have a large number of elements, they are fundamentally large electrical systems. In other words, the size of the array system is large with respect to the Radio Frequency (RF) wavelengths used.

Figure 1:
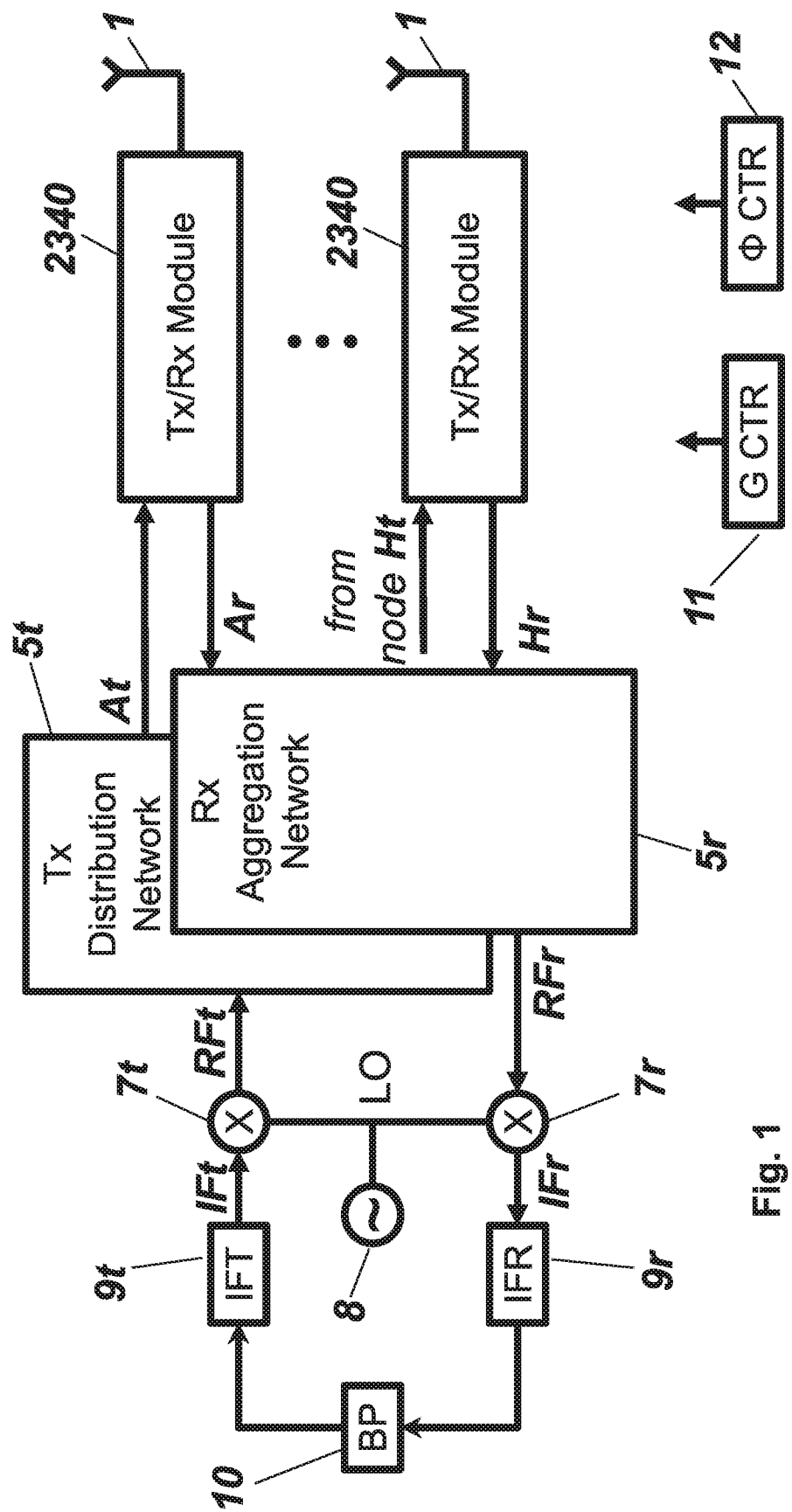
FIG. 1 depicts a simplified schematic diagram of a typical classical analog phased array.

FIG. 1 illustrates the typical structure of a conventional analog active array such as a phased array for FDD (Frequency Division Duplexing) applications. The antenna elements 1 are placed in either linear, planar, or conformal configurations. Active Tx/Rx Modules 2340 drive the antenna elements for transmission and receive signals from the antenna elements for reception. The array system in FIG. 1 works as follows. During transmission, the baseband processor 10 sends a digital signal to an intermediate frequency (IF) transmit stage 9t, which converts this signal into an analog IF signal using digital-to-analog converters and filters and applies it to node IFt. A mixer 7t uses a local oscillator signal (LO) generated by the LO generator 8 to up-convert the analog transmit IF signal to radio frequency (RF) and applies it to node RFt. Then, this RF signal is distributed to all Tx/RX Modules 2340 via the Tx Distribution Network 51. The Tx/Rx Modules drive the antenna elements 1. During reception, the RF signals from the antenna elements 1 are received by the Tx/Tx Modules 2340 and are aggregated via the Rx Aggregation Network Sr into a single RF receive signal applied at node RFr. This RF receive signal is down-converted to IF by mixer 7r using the LO signal from LO generator 8. The IF receive stage 9r converts the analog IF receive signal into a digital signal using analog-to-digital converters and filters and sends it to the baseband processor 10. In general, transmit and receive IF values may be different (in which case there are two LO signals, not shown in FIG. 1 for simplicity) but they may also be equal. In the case where the IF signals passing through the stages 9t and 9r are baseband signals (zero IF) the IF stages 9t and 9r and the mixers 7t and 7r are complex blocks, i.e. they process in-phase (I) and quadrature (Q) signals. The values of IF (non-zero or zero) are not essential. For the rest of this specification non-zero IF values are considered (no I/Q processing), but all discussions and conclusions are also valid for the zero IF cases.

The Tx/Rx Modules 2340 in FIG. 1 contain amplifiers, filters, adjustable phase shifters and adjustable gain stages.

Control blocks 12 and 11 fix or change the settings of these phase shifters and gain stages separately and independently, usually over digital control buses. A program running in the baseband processor 10 or other digital controller (not shown for simplicity) drives the control blocks 11 and 12. Each set of phase and gain values for all antenna elements implement a specific radiation patterns such as a narrow beam or a more complex shape. By changing these sets of phase and magnitude values appropriately, the array radiation (both transmit and receive) is shaped to implement advanced functions such as beam steering for tracking a movable target, beam scanning, fanning (changing beam size), etc.

Figure 2:
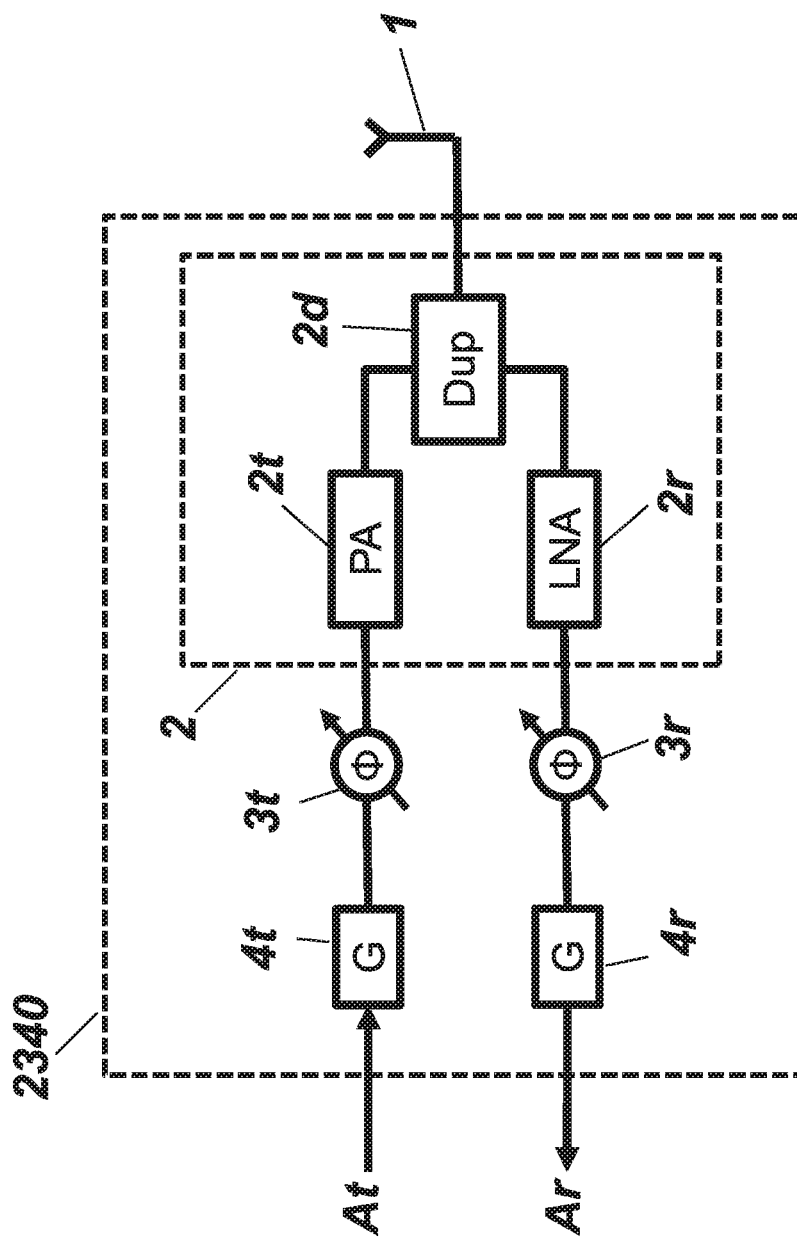
FIG. 2 depicts a simplified schematic diagram of a phased array Tx/Rx Module with a single transmit and a single receive channel.

FIG. 2 shows a simplified schematic of a typical Tx/Rx Module 2340. On the transmit path, the RF transmit signal at node At passes through an adjustable gain stage 4t, an adjustable phase shifter 3t and a power amplifier 2t. Finally, the transmit signal is sent to the antenna element 1 through a duplexer 2d. On the receive path, the received RF signal passes from the antenna element 1 through the duplexer 2d to the low noise amplifier 2r, an adjustable phase shifter 3r and an adjustable gain stage 4r. The receive RF signal exits the TX/RX Module at node Ar. The block 2 containing the power amplifier 2t, the low noise amplifier 2r and the duplexer 2d is called the RF front-end or RF-FE.

The architecture of the active array in FIG. 1 contains a single transmit channel and a single receive channel. Multiple independent channels may be supported by adding parallel transmit and receive paths. For example, a second independent transmit channel would have a separate digital connection to the baseband controller 10, a separate IF stage 9t, a separate up-conversion mixer 7t, a separate Distribution Network 5t, and separate adjustable phase shifters 3t and adjustable gain stages 4t in the Tx/Rx Modules. The two transmit RF signals would be added before entering the power amplifier 2t in the Tx/Rx Module. Additional transmit channels may be added in the same manner. Similarly, multiple receive channels may be added by duplicating as many times as necessary the adjustable phase shifters 3r and adjustable gain stages 4r in the Tx/Rx Module, and also the Aggregation Network 5r, the down-conversion network 7r and the IF stage 9r. Just as in the transmitter case, multiple digital connections to the baseband processor 10 would be needed to support multiple receive channels.

Figure 3:
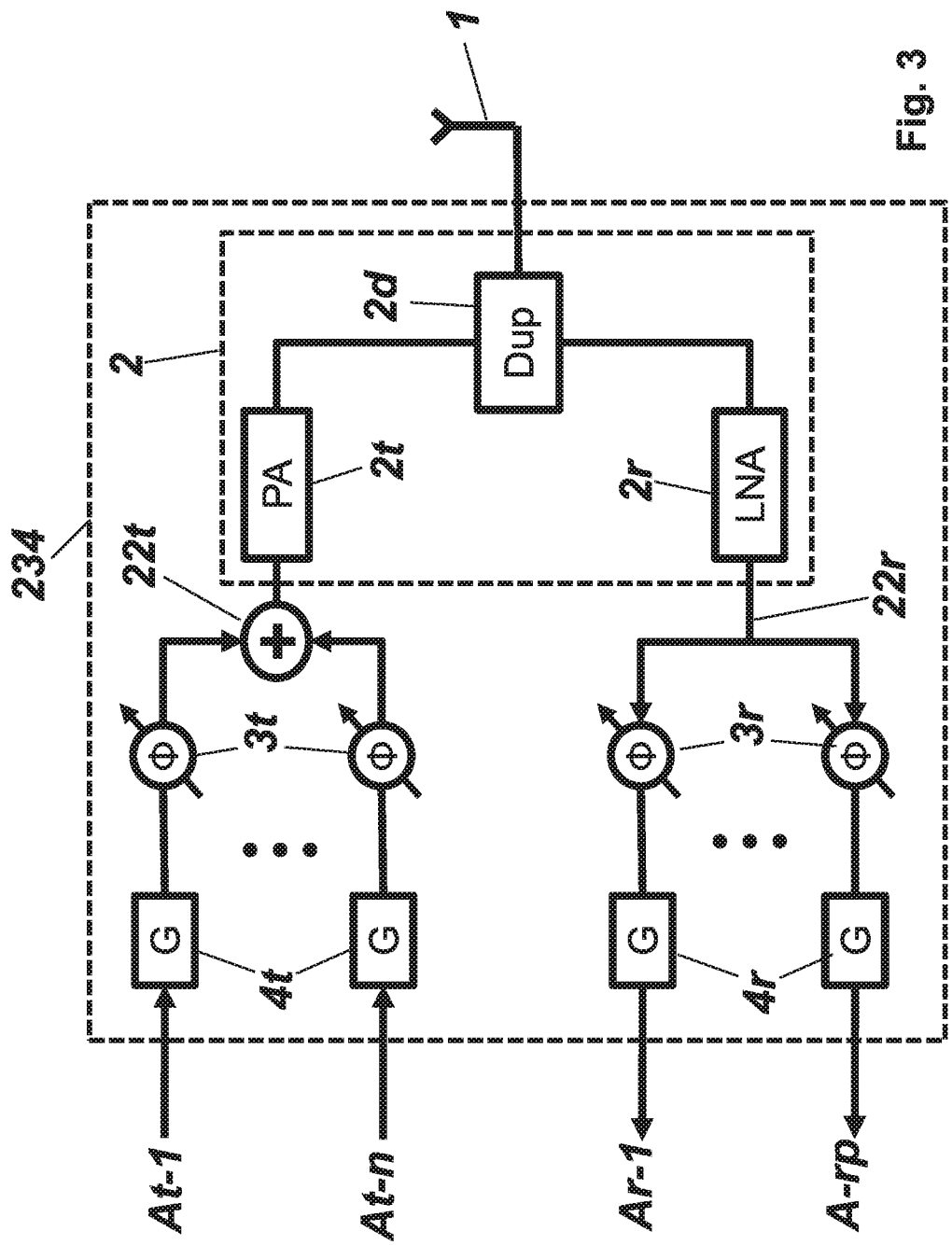
FIG. 3 depicts a simplified schematic diagram of a phased array Tx/Rx Module with multiple transmit and receive channels.

The diagram of a multiple channel Tx/Rx Module 234 is shown in FIG. 3. There are n input terminals for n transmit channels (At-1, At-2 . . . At-n) and p output terminals for p receive channels (Ar-1, Ar-2 . . . Ar-p). Inside the Tx/Rx Module 234 all transmit signals are added with adder 22t and all receive signals are generated by the signal splitter 22r. The RF-FE 2 inside Tx/Rx Module 234 is the same as in the Tx/Rx Module 2340 of FIG. 2.

The architecture of the active array in FIG. 1 with multiple transmit/receive channels and Tx/Rx Modules as in FIG. 3 has symmetry between the transmit and the receive paths if the directions of signal flow are ignored. For this reason, it is possible and convenient to represent this complex architecture very simply as in FIG. 4. When discussing any transmit path, the signals are considered flowing from the baseband processor 10 to the antenna elements 1 and when discussing any receive path the signals are considered flowing from the antenna elements 1 to the baseband processor 10. Therefore, the adjustable phase shifter 3 in FIG. 4 comprises phase shifters 3t and 3r in FIG. 3, the adjustable gain stage 4 comprises gain stages 4t and 4r, the network 5 comprises the networks 51 and 5r, the mixer 7 comprises mixers 7t and 7r and the IF stage 9 comprises IF stages 9t and 9r.

Figure 4:
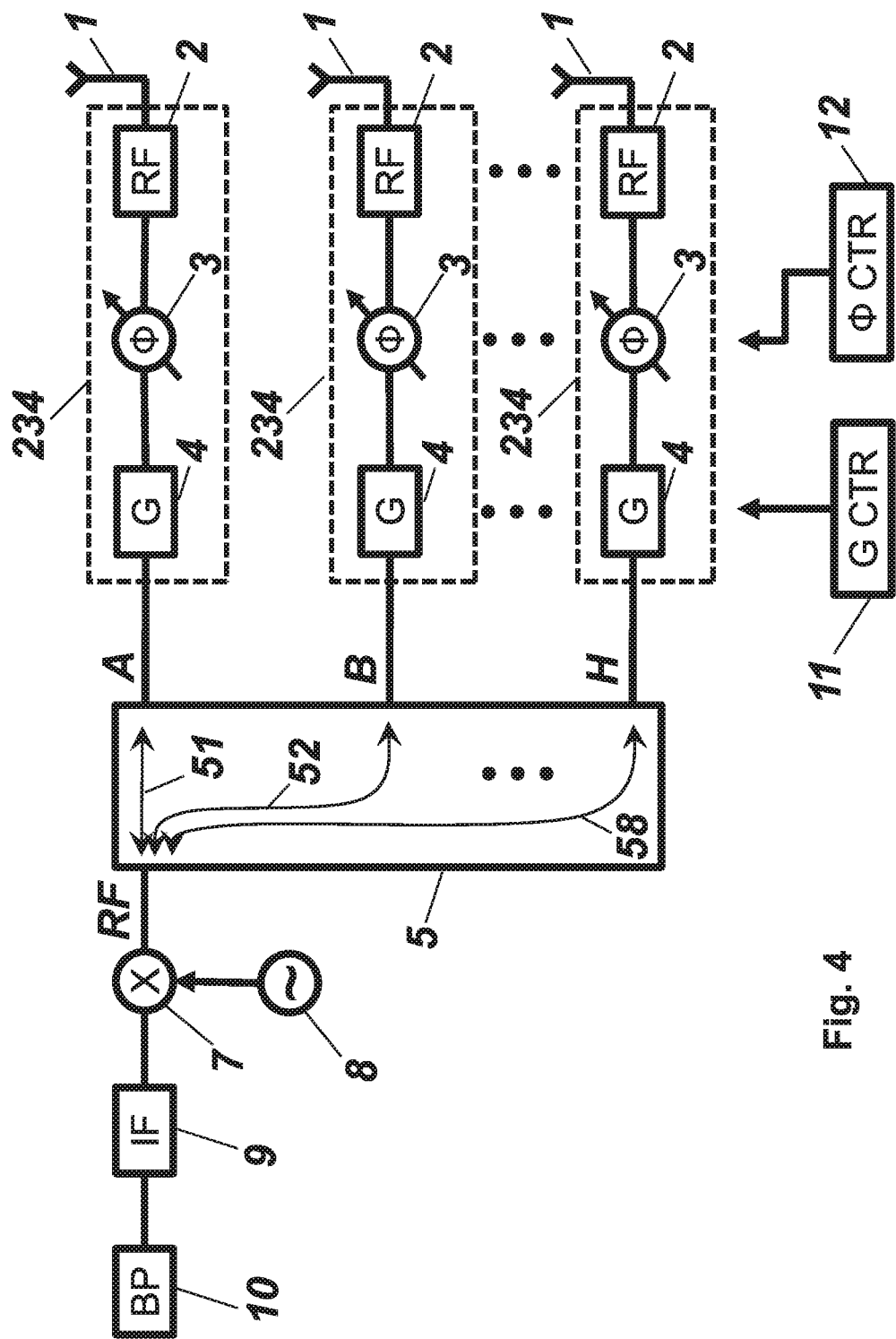
FIG. 4 depicts an abridged schematic diagram of a classical analog phased array with multiple transmit and receive channels.

Yet another architectural possibility represented equally by the diagram of FIG. 4 is a phased array operating in Time-Division Duplexing (TDD) mode. All cases discussed so far have been for Frequency-Division Duplexing (FDD). In the TTD case, the RF-FE contains an RF switch instead of the Duplexer. The approaches described herein are equally valid for FDD and TDD architectures. For the rest of this specification FDD operation is shown specifically, but all discussions and conclusions are directly applicable to TDD operation.

Typically, each Tx/Rx Module 234 is an electrically small system (physical size on the same order of magnitude or smaller than the RF wavelength) but when a plurality of Tx/Rx Modules are placed behind the antenna elements in the array, a large active electrical system is created. For the conventional analog array of FIG. 4, the Distribution/Aggregation network 5 is the only system component spanning over large electrical distances. In the transmit direction, the mixer 7 drives the single port RF of the network 5, which distributes the transmit RF signal coherently (e.g., equal output phases) to all Tx/Rx Modules via paths 51, 52, 58, etc. In the receive direction, the Tx/Rx Modules drive the ports A, B H of the network 5, which aggregates these signals coherently into a single receive signal applied to the mixer 7 via paths 51, 52, 58, etc. Typically, the distribution/aggregation network 5 is a passive linear reciprocal network with electrically identical paths 51, 52 . . . 58. This requirement ensures the coherent distribution/aggregation of signals.

Figure 5:
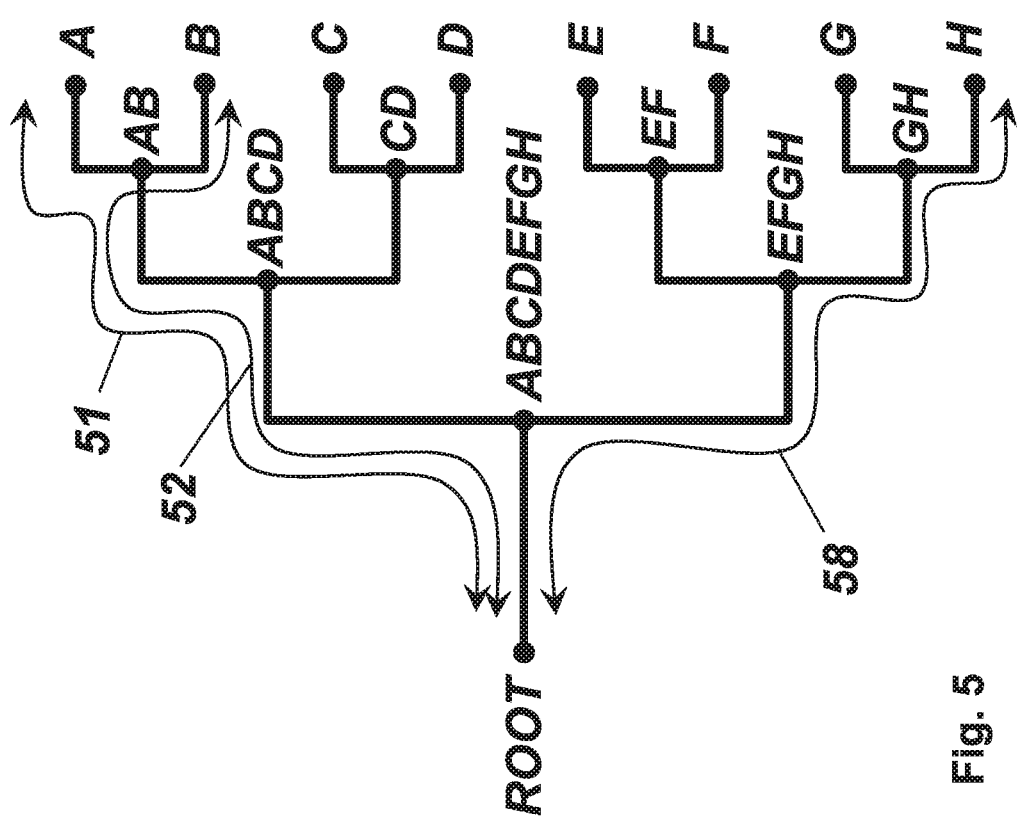
FIG. 5 depicts a schematic diagram of a classical corporate feed with eight top branches.

FIG. 5 shows the structure of the most common distribution/aggregation network used in active arrays, called a "corporate feed" or an "RF manifold". This passive linear network consists of sections of transmission lines connected in a tree structure with N-fold electrical symmetry, where N is the number of top branches terminating in the nodes A, B . . . H. The electrical distance or the signal propagation time from the node ROOT to any of these nodes are essentially identical. The example in FIG. 5 is a one-dimensional corporate feed with eight branches. Corporate feeds with more branches and of higher dimension (e.g., two-dimensional for planar arrays) are similar but more complex. The more elements they feed the more electrical symmetries they must have (electrically equal end-to-end paths). This explains the fundamental reason why corporate feeds are expensive to manufacture. The large number of symmetries are realized by maintaining uniform electrical properties over large electrical distances, requiring expensive materials and assembly technologies.

Here we discussed the usual case where the distribution/aggregation network (e.g. corporate feed) paths have the same electrical length but distribution/aggregation networks with paths, which have different electrical lengths can also be used as long as the differences in these lengths are taken into account when programming the phase shifts in the Tx/Rx Modules.

Conventional End-to-End Active Array Calibration

Even when the distribution/aggregation network 5 in FIG. 4 is a high quality corporate feed, the entire system is still susceptible to large phase and magnitude errors due to manufacturing and operational variations of the Tx/Rx Modules. A practical option for obtaining workable albeit expensive systems is to design the Tx/Tx Modules with stable characteristics over operational variations such as temperature and humidity but not attempting to obtain fully predictable characteristics over manufacturing variations, which would increase further the already high cost. This requires a post-manufacturing factory calibration and regular re-calibrations after a number of field operating hours.

Figure 6:
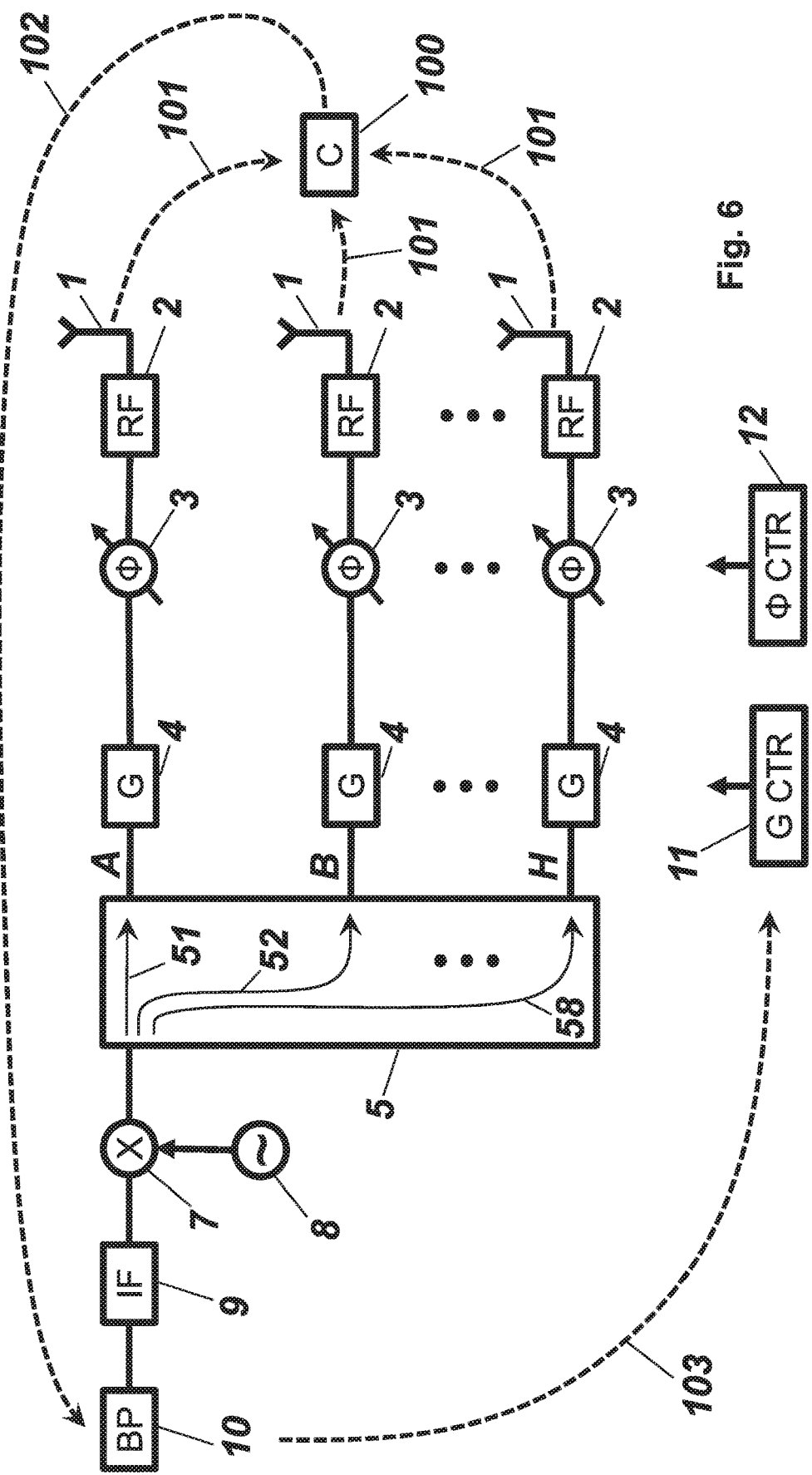
FIG. 6 depicts a simplified schematic diagram of a typical transmitter calibration method for the classical analog phased array in FIG. 4.
Figure 7:
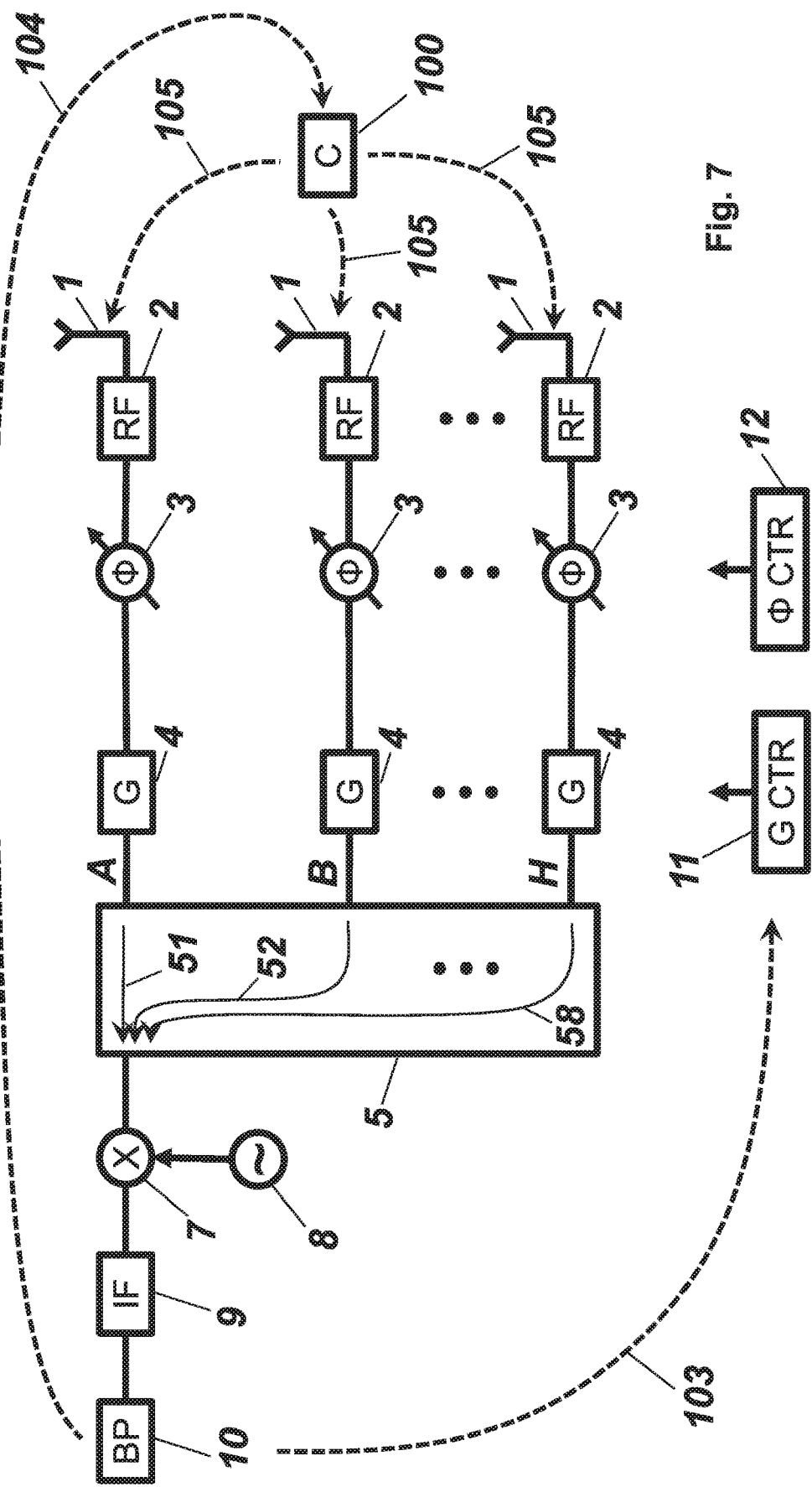
FIG. 7 depicts a simplified schematic diagram of a typical receiver calibration method for the classical analog phased array in FIG. 4.

The typical methods for calibrating conventional arrays are shown in FIGS. 6 and 7 for transmitter and receiver calibration respectively. In both cases, a calibrating network 100 is necessary to perform end-to-end calibration of all array paths sequentially. In the transmitter case of FIG. 6, the baseband processor 10 sends a signal through the array system, which the calibrating network 100 receives from each antenna element, one at a time (signals 101). In other words, when the calibrating network 100 receives the signal 101 from a particular antenna element, all Tx/Rx Modules are turned off except for the Tx/Rx Module of the antenna element under consideration. The calibrating network 100 sends the received signal back to the baseband processor 10, which compares the received signal 102 with the transmitted signal and calculates the phase and magnitude characteristics of that particular transmitting path. After all transmitting paths corresponding to all antenna elements are characterized in the same fashion the baseband processor 10 has all information necessary to compensate the values of the array magnitudes and phases through signal 103 such as to eliminate the manufacturing variations.

The receiver case shown in FIG. 7 is similar to the transmitter calibration with signals reversed. The baseband processor 10 sends a signal 104 to the calibrating network 100, which redirects it to all antenna elements one at a time (signals 105). The signal 105 received by a single Tx/Tx Module (all others are off) propagates through the array system and returns to the baseband processor 10. A comparison between transmitted and received signals results in an accurate phase/magnitude characterization of all receive paths. As in the transmitter case, the baseband processor 10 has all information necessary to compensate the values of the array magnitudes and phases through signal 103 such as to eliminate the manufacturing variations.

Notice that both in the transmitter and receiver cases, these end-to-end calibration processes compensate for the total phase/magnitude errors of each end-to-end path, which are the sums of errors occurring in the distribution network and the Tx/Rx Modules. The total compensation values obtained this way cannot be separated into compensation values for the distribution network and compensation values for the Tx/Rx Modules. However, if the distribution network has negligible errors, as is often the case with high quality corporate feeds the compensation values result only from the Tx/Rx Module errors. Nevertheless, a major limitation of these end-to-end calibration techniques is that during calibration all normal operation of the array must be stopped because a portion of any signal path to be calibrated is shared by all signal paths (e.g. the distribution network).

The conventional end-to-end array calibration method described in this section relies on using an accurate calibration network 100, carefully built and manually tuned to generate equal signals 101 in the system of FIG. 6 and equal signals 105 in the system of FIG. 7 to/from all antenna elements of the array. This calibration network is mostly suitable for use in the factory environment as a separate testing setup because including it in the array system is rather uneconomical for large arrays.

The implementation of the array compensation after calibration may be done with hardware means such as adjusting delay lines or gain stages or with software means by calculating the necessary phase and magnitude values for the Tx/Rx Modules, which compensate the array errors in addition to generating the desired radiation pattern.

A new calibration method for active arrays, which yields economical implementations suitable for inclusion into the array, is described below. In addition, this method allows automatic calibration of the front end of the array system without interrupting the normal operation of the array.

Analog Arrays with IF Feed

Figure 8:
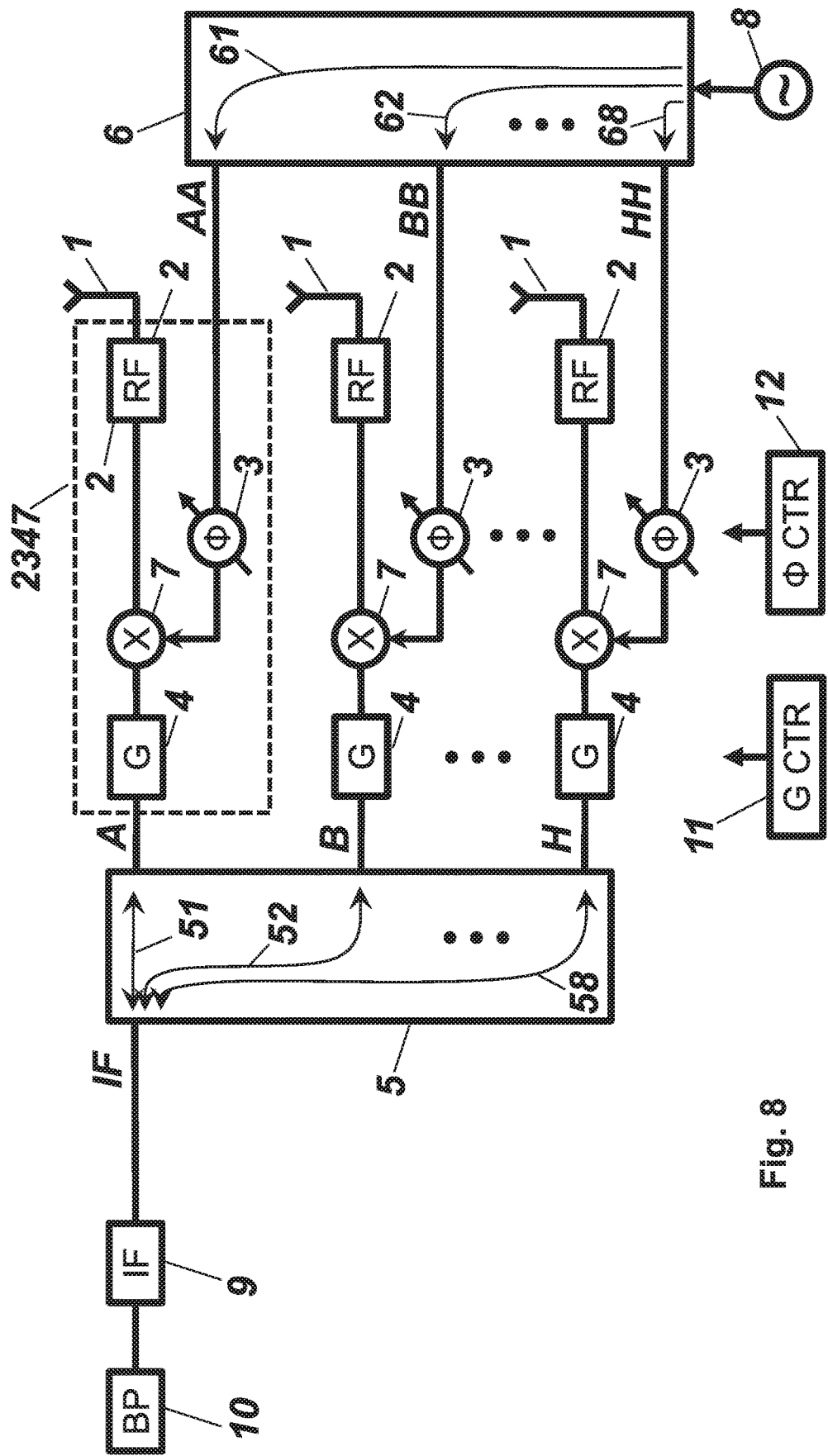
FIG. 8 depicts an abridged schematic diagram of an analog phased array with IF feeds similar to the architecture described in U.S. Pat. No. 8,611,959.
Figure 9:
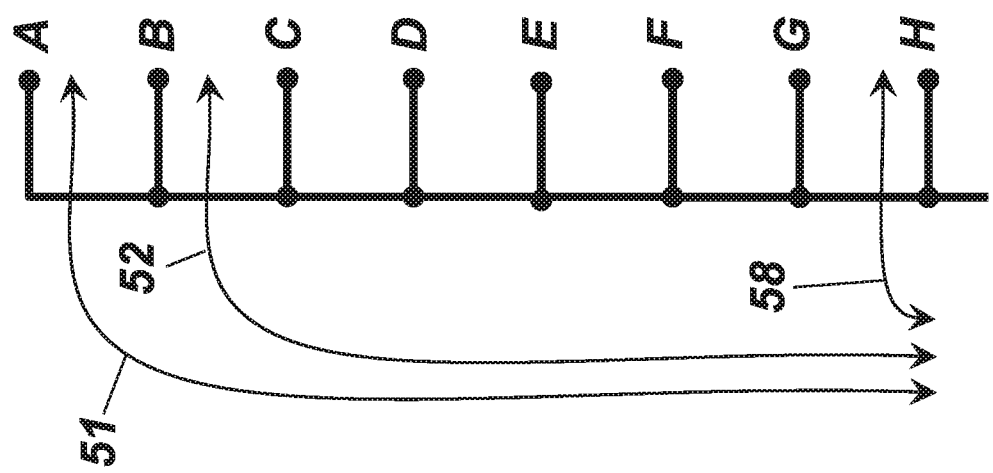
FIG. 9 depicts a schematic diagram of a serial feed network.

FIG. 8 illustrates an analog array architecture with IF feed, similar to the structures described in U.S. Pat. No. 8,611,959. The diagram of FIG. 8 is abridged in the same manner as that of FIG. 4, representing an array with multiple transmit and receive channels operating either in FDD or TDD mode. The mixer 7 from FIG. 4 has been moved inside the Tx/Rx Modules 2347. Naturally, now in the system there are as many instances of mixer 7 as there are Tx/Rx Modules. This change has important beneficial consequences for the cost of the active array. First, the distribution/aggregation network 5 now carries IF signals instead of RF signals. This simplifies the design of this network substantially since the distribution/aggregation network becomes much smaller electrically at IF than it is at RF (the physical size of the distribution network remains the same but the IF signals propagating through the network are at a much lower frequency than RF). For low-enough IF values, the simple serial distribution network in FIG. 9 may be used instead of the corporate feed because the signal phase shifts over a serial link at IF are much smaller than at RF. Second, the gain stages 4 also operate at IF rather than RF, another important simplification of the design specifications. Third, the phase shifters 3 may now be placed in the LO path rather than the signal path as in FIG. 4. This allows much easier designs of these components because shifting the phase of a sinusoidal signal is much easier than shifting the phase of a modulated signal. In fact, one of the cost barriers hardest to cross in traditional phased arrays such as the system in FIG. 4 is the availability of low-cost, high-quality programmable phase shifters operating over a wide signal bandwidth. In contrast, there are several methods for implementing super low cost, programmable phase shifters at a single frequency. These LO signal adjustable phase shifters will be called phase rotators.

Figure 10:
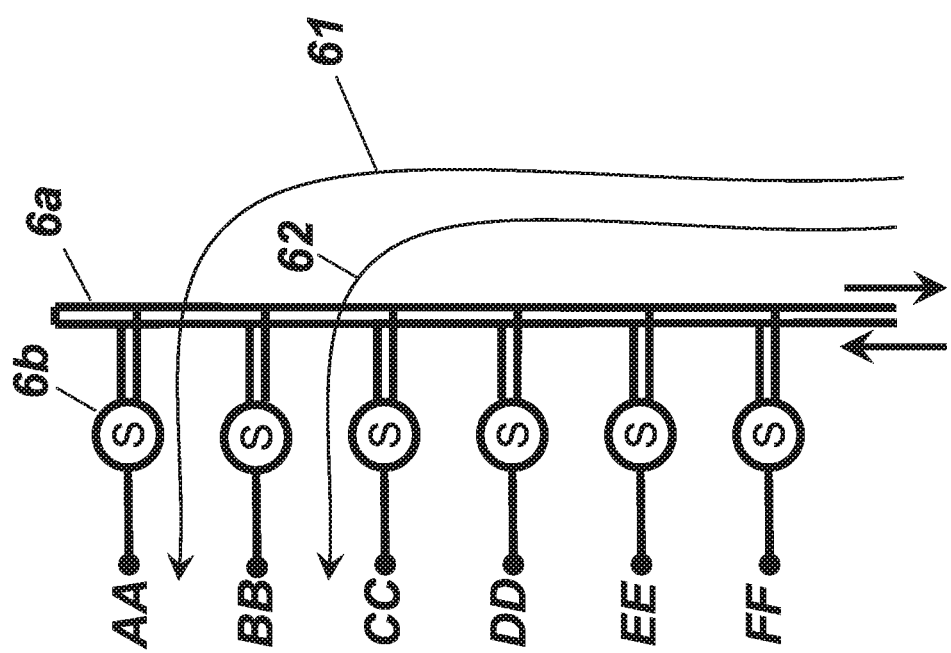
FIG. 10 depicts a schematic diagram of an LO-distribution network according to the methods described in U.S. Pat. No. 8,553,826.

One shortcoming of moving the mixer 7 from the schematic in FIG. 4 into the Tx/Rx Modules 2347 in FIG. 8 is the introduction of a new requirement to generate LO signals at the Tx/Rx Modules, which are globally coherent (identical frequency and predictable phases to a high degree of accuracy). This may be achieved by using a corporate feed to distribute across the array the LO signal generated by the oscillator 8. A lower cost option for LO coherent distribution, as per U.S. Pat. No. 8,611,959, is to employ the distribution method described in U.S. Pat. No. 8,553,826. FIG. 10 shows a simplified schematic of this distribution method. A dual tree network 6a with a long trunk and multiple short branches is constructed such as to generate node pairs at the end of the short branches providing respective pairs of signals with phases adding to a constant. Synchronization circuits 6b connected to these node pairs generate globally coherent LO signals. Yet another new and simpler method for coherent LO distribution is described in U.S. Ser. No. 15/259,639, entitled "Calibrating a Serial Interconnection," filed Sep. 8, 2016, and all of which is incorporated herein by reference.

The array in FIG. 8 can be calibrated according to the conventional methods in FIGS. 6 and 7. However, since the portion of the array from the baseband processor 10 to points A, B, C H, operates at low frequencies and the distribution network is usually passive, it is possible to design this portion of the array to have constant phase and magnitude characteristics over operational conditions such as temperature without a large cost penalty. In this case, the only parts of the array, which are vulnerable to meaningful phase and magnitude variations over operating conditions, are the Tx/Rx Modules. These must be calibrated as often as required by the operational drifts in phase and magnitude.

Calibrating the Tx/Rx Modules

Figure 11:
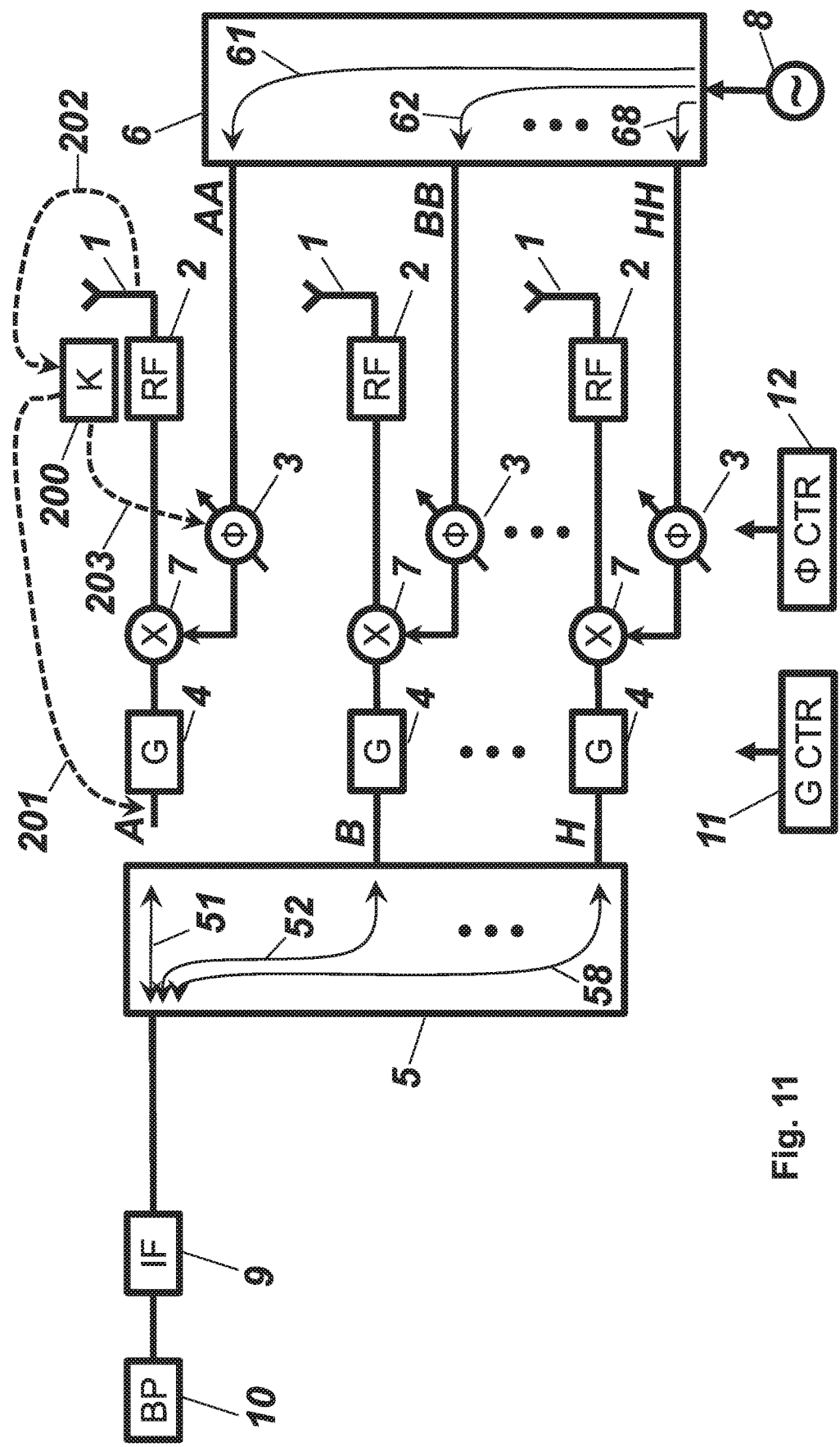
FIG. 11 depicts the principle for calibrating the transmitter phase shift of the Tx/Rx Module 2347 in FIG. 8.
Figure 12:
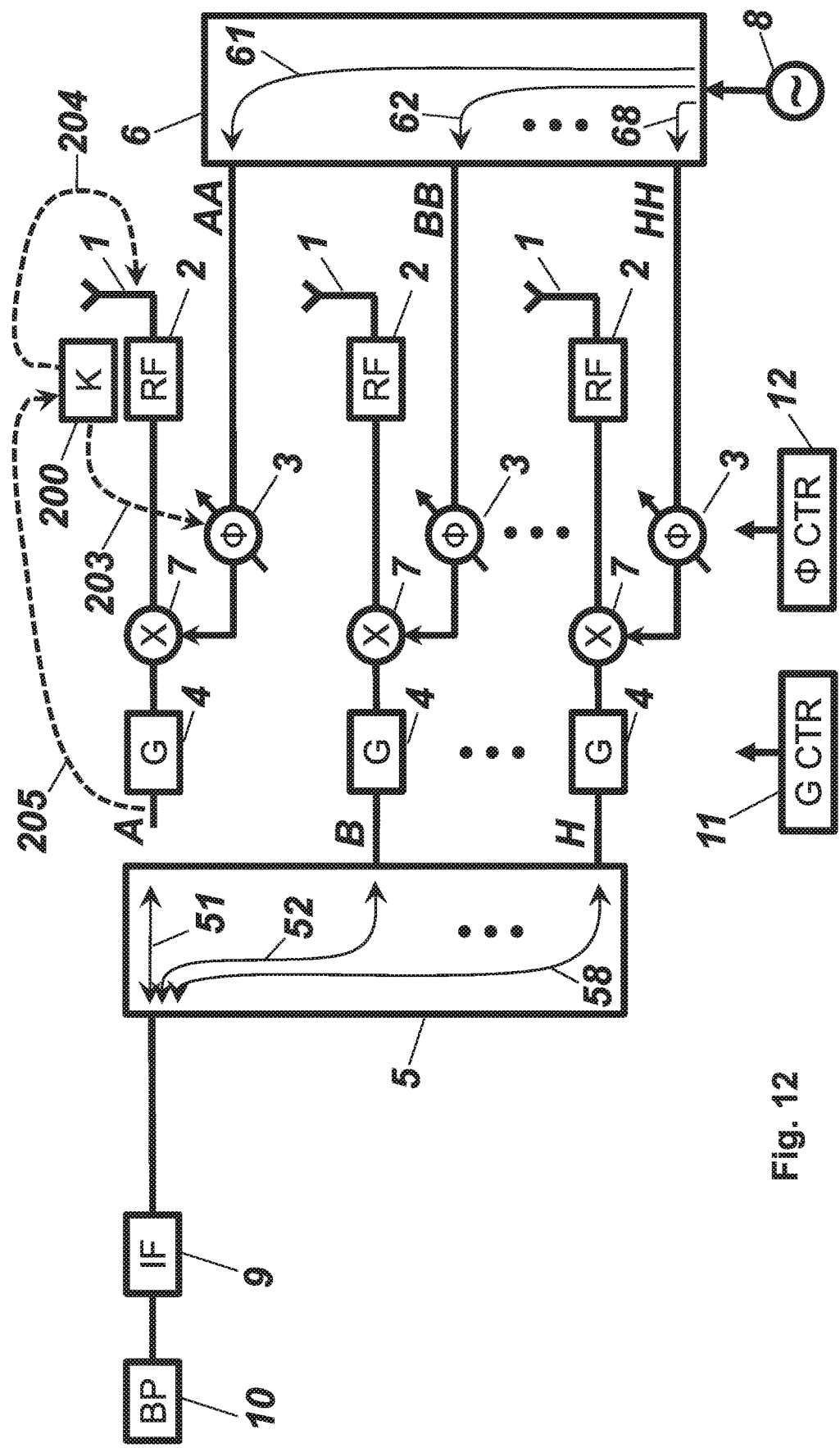
FIG. 12 depicts the principle for calibrating the receiver phase shift of the Tx/Rx Module 2347 of FIG. 8.
Figure 13:
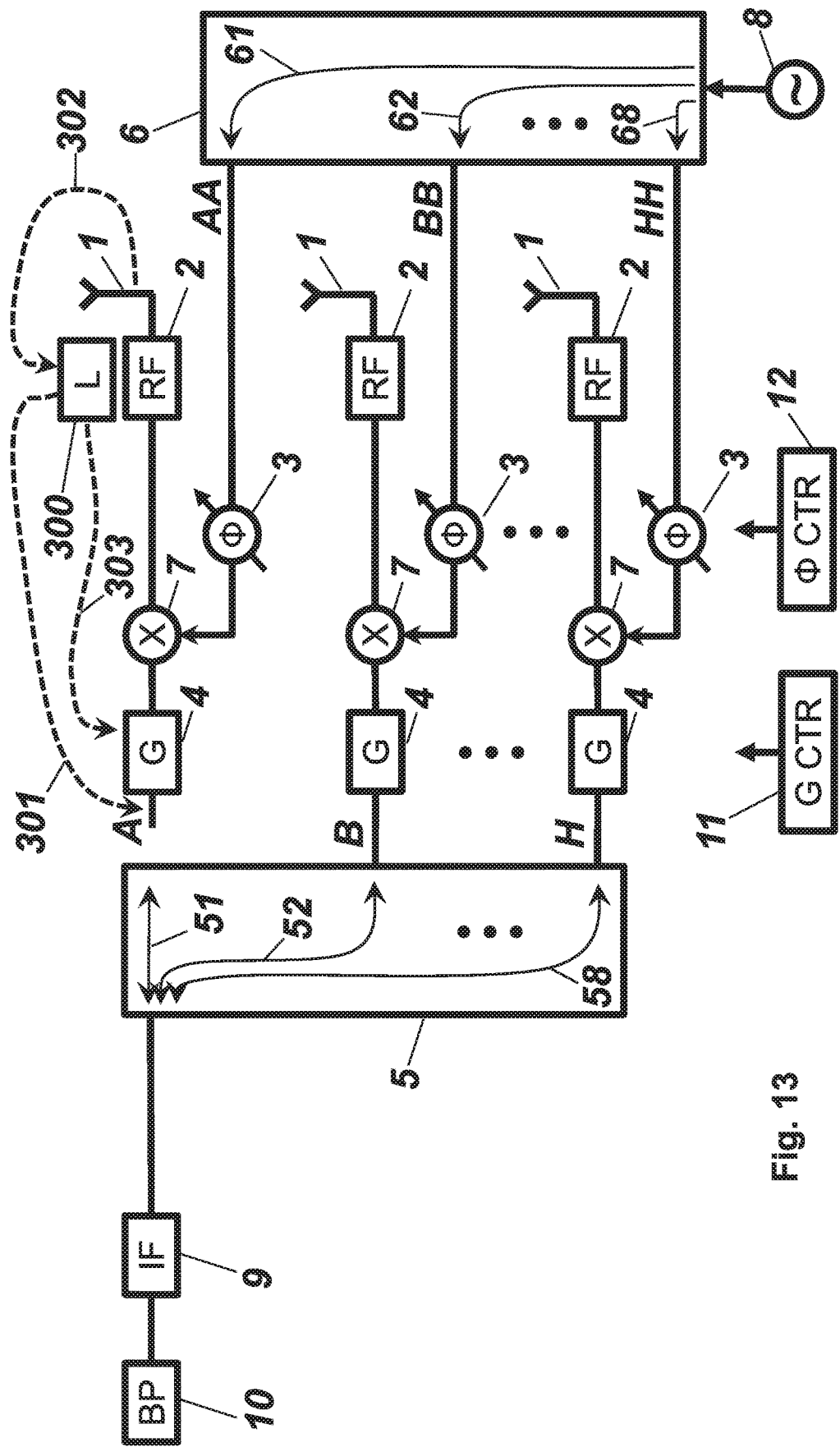
FIG. 13 depicts the principle for calibrating the transmitter gain of the Tx/Rx Module 2347 of FIG. 8.
Figure 14:
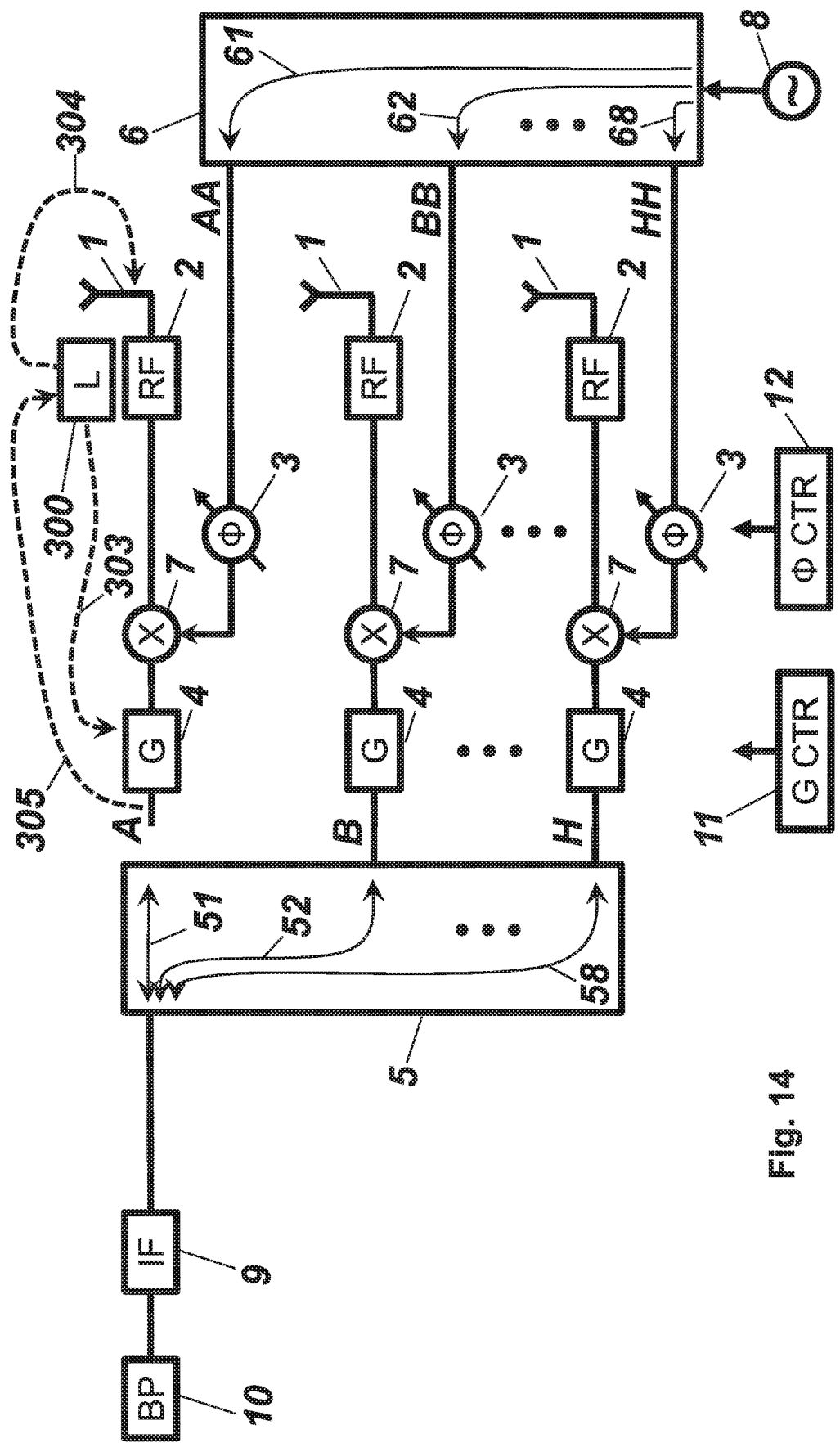
FIG. 14 depicts the principle for calibrating the receiver gain of the Tx/Rx Module 2347 of FIG. 8.

For the purpose of this section, we assume that all signal paths of the array in FIG. 8 from the baseband processor 10 to points A, B, C H and vice-versa are identical in terms of phase and magnitude characteristics and the only parts of the array in need of calibration are the Tx/Rx Modules 2347. The proposed phase calibration methods for the Tx/Rx Module are shown in FIGS. 11 and 12 for transmit and receive paths, respectively, and the proposed gain calibration methods for the Tx/Rx Module are shown in FIGS. 13 and 14 for transmit and receive paths, respectively. In all cases, the Tx/Rx Module under calibration is electrically disconnected from the IF distribution/aggregation network 5. Next, we describe each method separately.

For the transmit phase calibration case shown in FIG. 11, a calibrating circuit 200 applies an IF signal 201 having the appropriate transmit frequency to the IF input of the Tx/Rx Module and detects the RF signal 202 coming from the antenna element connected to the respective Tx/Rx Module. The RF signal 202 is the Tx/Rx Module response to the IF signal 201. In the idealized case where the gain stage 4, the mixer 7, and the RF-FE 2 have instantaneous propagation time (no delays), the resulting phase of the signal 202 is defined as an RF reference phase with respect to the IF signal 201. In general, the actual phase of the signal 202 is larger than the RF reference phase (202 delayed with respect to 201) because of finite propagation time over the various components of the Tx/Rx Module such as the gain stage 4, the mixer 7, and the RF-FE 2. The difference between the phase of the signal 202 and the RF reference phase varies from Tx/Rx Module to Tx/Rx Module with fabrication and operating conditions and varies in time even for the same Tx/Rx Module with operating conditions (e.g. temperature). This is exactly the reason why phase calibration is necessary. The calibrating circuit 200 measures the difference between the phase of the signal 202 and the RF reference phase with respect to the IF signal 201 and generates a signal 203. This signal 203 adjusts the setting of the phase rotator 3 until the said phase difference becomes a fixed number such as 90 degrees (generally larger than the original phase difference because real systems are causal). This is possible because the LO signal phase shifting via the phase rotator 3 effects directly and linearly the phase of the calibrating signal propagating through the Tx/Rx Module. If all array Rx/Tx Modules are calibrated in this way, for a time duration during which the operating conditions do not change significantly, the entire transmit section of the array is calibrated in phase.

The receive phase calibration case shown in FIG. 12 is similar to the transmit phase calibration case with signals reversed. The calibrating circuit 200 applies an RF signal 204 having the appropriate receive frequency to the RF input of the Tx/Rx Module and detects the IF signal 205 coming from the IF port of the respective Tx/Rx Module. The IF signal 205 is the Tx/Rx Module response to the RF signal 204. In the idealized case where the RF-FE 2, the mixer 7, and the gain stage 4 have instantaneous propagation time (no delays), the resulting phase of the signal 205 is defined as an IF reference phase with respect to the RF signal 204. In general, the actual phase of the signal 205 is larger than the IF reference phase because of finite propagation time over the various components of the Tx/Rx Module such as the RF-FE 2, the mixer 7, and the gain stage 4. The difference between the phase of the signal 205 and the IF reference phase varies from Tx/Rx Module to Tx/Rx Module with fabrication and operating conditions and varies in time even for the same Tx/Rx Module with operating conditions (e.g. temperature). The calibrating circuit 200 measures the difference between the phase of the signal 205 and the IF reference signal with respect to the RF signal 204 and adjusts the setting of the phase rotator 3 until the said phase difference becomes a fixed number such as 90 degrees (generally larger than the original phase difference because real systems are causal). This is possible because the LO signal phase shifting via the phase rotator 3 effects directly and linearly the phase of the calibrating signal propagating through the Tx/Rx Module. If all array Rx/Tx Modules are calibrated in this way, for a time duration during which the operating conditions do not change significantly, the entire receive section of the array is calibrated in phase.

For the transmit gain calibration case shown in FIG. 13, a calibrating circuit 300 applies an IF signal 301 having the appropriate transmit frequency to the IF input of the Tx/Rx Module and detects the RF signal 302 coming from the antenna element connected to the respective Tx/Rx Module. The RF signal 302 is the Tx/Rx Module response to the IF signal 301. In general, the ratio between the amplitude of signal 302 and the amplitude of the signal 301 (Tx/Rx Module transmit gain) varies from Tx/Rx Module to Tx/Rx Module with fabrication and operating conditions and varies in time even for the same Tx/Rx Module with operating conditions (e.g. temperature). This is exactly the reason why gain calibration is necessary. The calibrating circuit 300 measures the ratio between the amplitudes of the signals 302 and 301 and outputs a signal 303. This signal 303 adjusts the setting of the gain stage 4 until the said ratio becomes a fixed number such as two or ten. If all array Rx/Tx Modules are calibrated in this way for the same Tx/Rx Module transmit gain, for a time duration the operating conditions do not change significantly, the entire transmit section of the array is calibrated in gain.

The receive gain calibration case shown in FIG. 14 is similar to the transmit gain calibration case with signals reversed. The calibrating circuit 300 applies an RF signal 304 having the appropriate receive frequency to the RF input of the Tx/Rx Module and detects the IF signal 305 coming from IF port of the respective Tx/Rx Module. The IF signal 305 is the Tx/Rx Module response to the RF signal 304. In general, the ratio between the amplitude of signal 305 and the amplitude of the signal 304 (Tx/Rx Module receive gain) varies from Tx/Rx Module to Tx/Rx Module with fabrication and operating conditions and varies in time even for the same Tx/Rx Module with operating conditions (e.g. temperature). The calibrating circuit 300 measures the ratio between the amplitudes of the signals 305 and 304 and adjusts the setting of the gain stage 4 until the said ratio becomes a fixed number such as two or ten. If all array Rx/Tx Modules are calibrated in this way for the same Tx/Rx Module receive gain, for a time duration the operating conditions do not change significantly, the entire receive section of the array is calibrated in gain.

Figure 15:
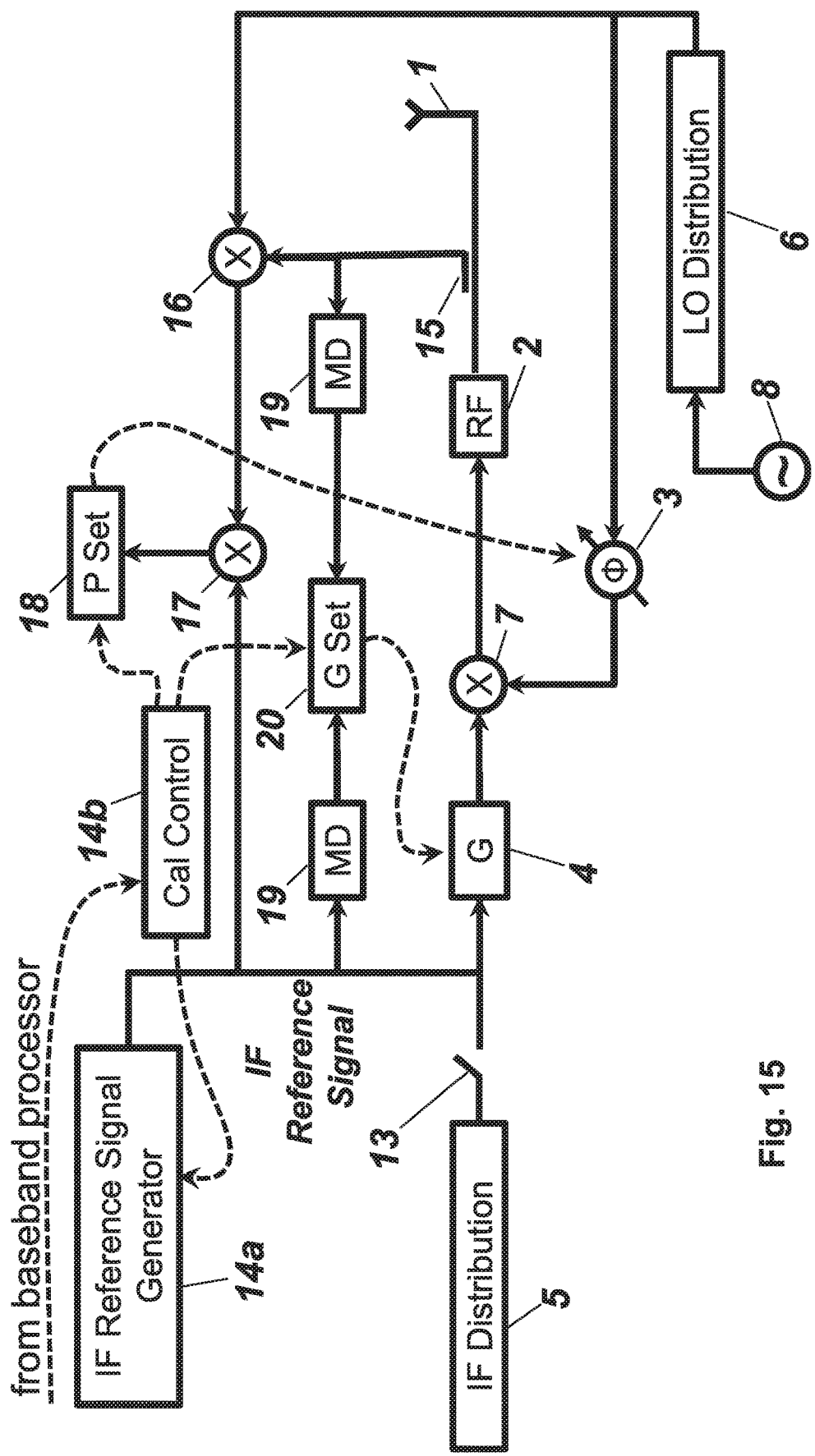
FIG. 15 depicts a simplified schematic diagram of the transmitter portion of a Tx/Rx Module with transmitter phase and gain calibration circuits.

In practice there are many possible implementations for the calibration principles illustrated in FIGS. 11, 12, 13, and 14. FIG. 15 shows an example of such an implementation for transmitter phase and gain calibration of the Tx/Rx Module. The electronics of the Tx/Rx Module 2347 from FIG. 8 (adjustable gain stage 4, mixer 7, phase rotator 3 and RF-FE 2) are augmented with a coupler 15, an RF mixer 16, an IF mixer 17, a phase calibration circuit 18, a gain calibration circuit 20, and two magnitude detectors 19. In addition, the calibration system requires an IF reference signal generator 14a and a calibration control block 14b. The array controller such as the baseband processor starts/stops the operation of control block 14b. The phase and gain calibration circuits 18 and 20 and the control block 14b contain digital state machines executing the calibration methodologies described earlier and have control over the required blocks in the Tx/Tx Module. FIG. 15 shows the control flow with dashed lines terminated by arrows. One embodiment of this scheme is within an integrated circuit in order to maintain high precision and low cost.

The Tx/Rx Module transmitter calibration procedure is as follows. After the array controller (e.g. baseband processor) initializes the calibration, the calibration control block 14b turns on the IF reference signal from the IF Signal Reference Generator 14a. The IF reference signal generator 14a in FIG. 15 applies an IF reference signal (calibrating signal) to the adjustable gain stage 4. This signal comes out of the RF-FE 2 as an RF calibrating signal, up-converted by mixer 7. The calibrating reference signal passes through the same stages as an actual signal when the array is in normal operation and therefore incurs the same phase and magnitude changes. The coupler 15 detects this RF calibrating signal and applied it to the first magnitude detector 19. The IF reference signal from the generator 14a is also applied to the second magnitude detector 19. The two magnitude detectors generate DC voltages proportional to the magnitude of their respective input signals. The gain calibrating circuit 20 adjusts the gain of the gain stage 4 until the DC voltages coming from the two magnitude detectors 19 are in a preset desired ratio. When this state is reached, the transmit gain of the Tx/Rx Module is set to the respective value.

The coupler 15 applies the RF reference signal coming from the RF-FE 2 also to the RF mixer 16, which down converts it back to IF such that phase comparison with the original IF reference signal coming from the generator 14a is possible (phases can be compared only when the signals have the same frequency). The IF mixer 17 compares the phases of the two IF signals by multiplication and generates a DC signal equal to $\cos(\phi_1-\phi_2)$, where $\phi_1$ and $\phi_2$ are the respective phases. This DC value is zero when the phases of the two IF signals differ by $(2n-1)\ \pi/2$ radians, where n is any integer (most important n=1) and is a maximum or minimum when the phases of the two IF signals differ by $(2n)\ \pi/2$ radians. This phase detection scheme has 180-degree monotonicity, which is large enough to capture all practical phase errors. The phase calibrating circuit 18 rotates the phase of the LO signal driving mixer 7, through the phase rotator 3 until the DC generated by the mixer 17 reaches a specific set value, preferably zero or a maximum/minimum. These preferred values (zero or maximum/minimum) are important in practice because they are relative values with respect to all other DC values generated by the mixer 17 and therefore are easy to detect and are insensitive to circuit variations. After the phase calibrating circuit reaches the desired state, the signal delay through the Tx/Rx Module transmit path corresponds to a predetermined phase difference such as 90 degrees (zero DC value at output of mixer 17) or 180 degrees (minimum DC value at output of mixer 17). It is important to notice that gain calibration should precede phase calibration because changing the gain of the Tx/Rx Module can also change the phase while phase changes do not affect the gain.

Figure 16:
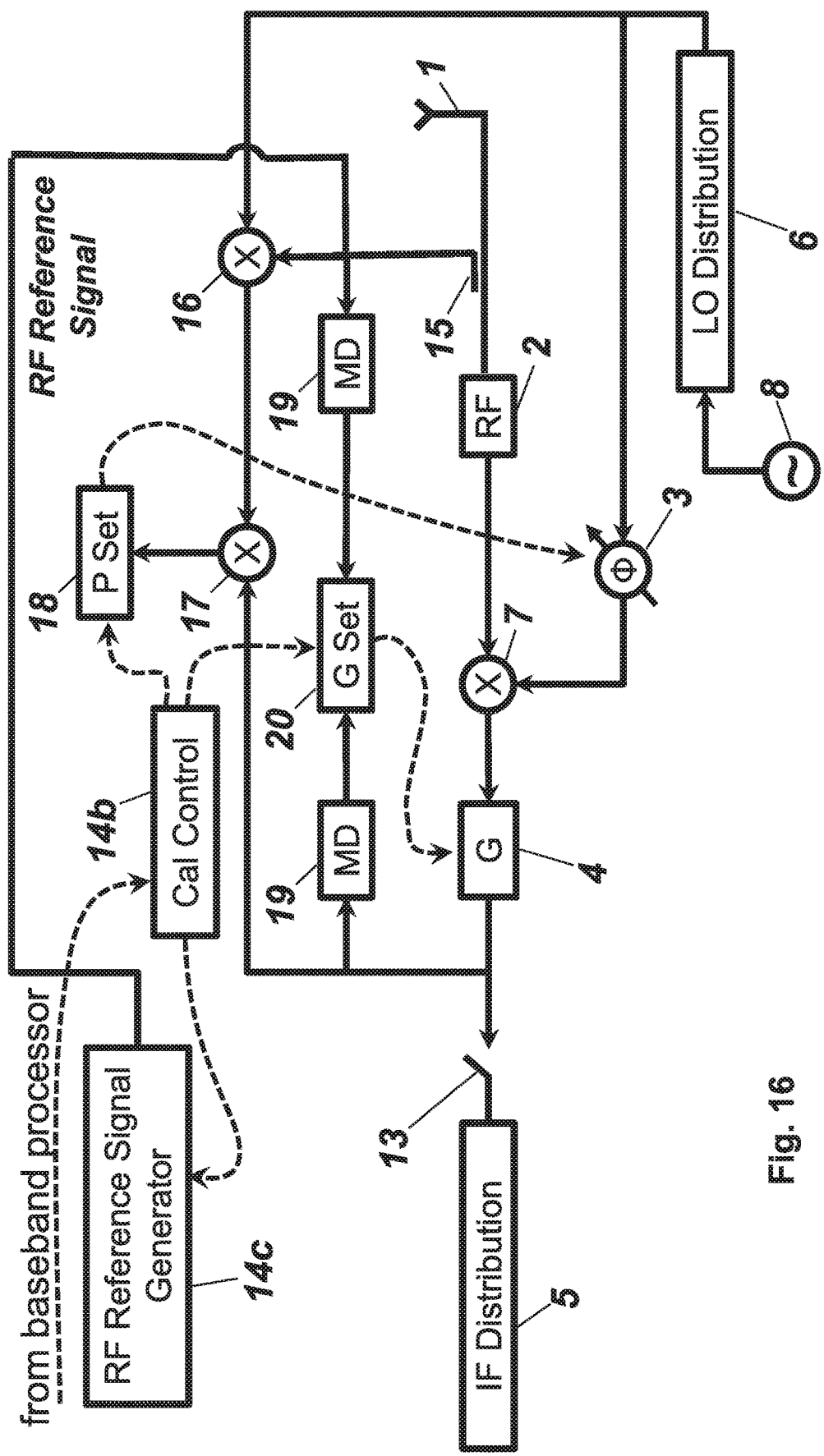
FIG. 16 depicts a simplified schematic diagram of the receiver portion of a Tx/Rx Module with receiver phase and gain calibration circuits.

FIG. 16 shows how the same enhanced Tx/Rx Module from FIG. 15 can be also used for receiver phase and gain calibration of the Tx/Rx Module. In this case, an RF reference signals generator 14c is necessary applying the reference signal to the RF input of the Tx/Rx Module. The operation of this circuit is identical with the operation in the transmitter case with some signals reversed, as shown in FIG. 16. The coupler 15 is used to inject the RF reference signal into the RF port of the Tx/Rx Module.

In all cases of Tx/Rx Module calibration (phase or magnitude), the calibration values for the phase rotator 3 and the gains stage 4 may be processed locally at the Tx/Rx Module level or globally at the array control level residing usually in the baseband processor 10 (see FIG. 8) or in another controller. If the calibration values are processed locally, the Tx/Rx Module must contain means to add these calibration values to the programming phase and magnitude values received from the array baseband processor. If the calibration values are processed globally, these calibration values must be reported to the baseband processor (e.g. via digital busses), which will include them in the calculation of the necessary phases and magnitudes to generate specific radiation patterns.

Calibrating the Distribution/Aggregation Network

Next, we remove the assumption made in the previous section that for the array in FIG. 8 all signal paths from the baseband processor 10 to points A, B, C H and vice-versa are identical in terms of phase and magnitude characteristics. Since the baseband processor 10 and the IF stage 9 are common to all signal paths, the previous assumption is equivalent to assuming the distribution network 5 is perfect, producing no phase and magnitude errors.

In practice, the networks 5 in FIGS. 4 and 8 achieve insignificant phase and magnitude errors over fabrication and operational conditions only if they are produced with expensive materials and assembly. This may be acceptable for some high-end applications but for most commercial applications, it is not. The very motivation for introducing the architecture in FIG. 8 is to lower the cost of network 5 by operating it at IF rather than RF as in the classical architecture of FIG. 4.

Due to operation at a much lower frequency than RF, the network 5 can be designed to be low cost and still maintain low phase/magnitude variations over temperature and other operational conditions. This is usually the case even for a simple serial distribution/aggregation network as in FIG. 9 implemented on some of the lowest cost printed circuits boards (PCBs) such as FR4 boards ("Flame Retardant 4" standard designation by National Electrical Manufacturers Association). However, the electrical properties of these low-cost distribution/aggregation networks do vary substantially with the fabrication process, rendering them unusable without a post-manufacturing calibration to even out manufacturing variations. Next, we introduce several calibration methods for the distribution/aggregation network 5 in FIG. 8.

Figure 17:
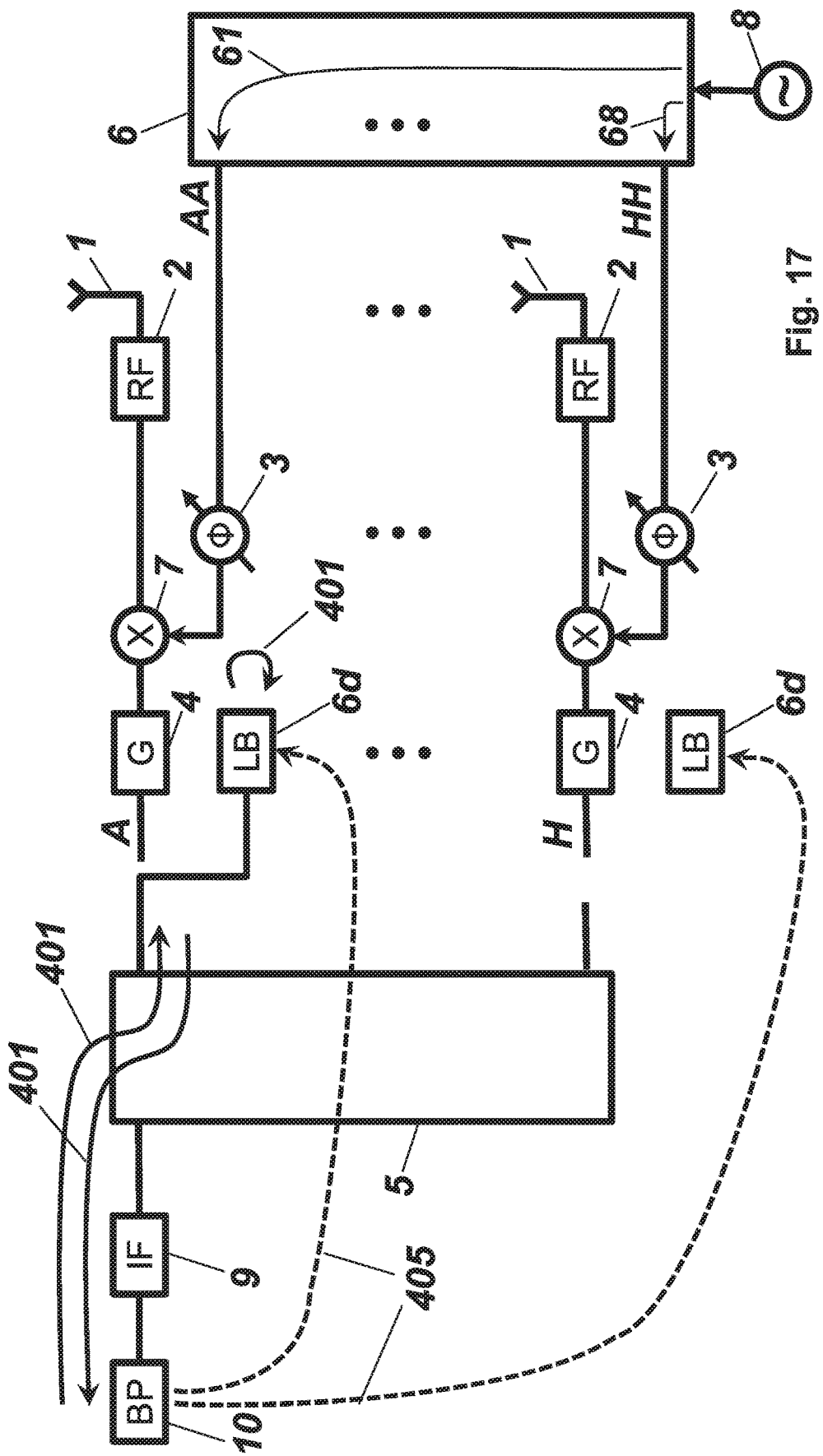
FIG. 17 depicts a first principle for the calibration of the IF distribution and IF aggregation networks of the phased array in FIG. 8.

The first calibration method for the distribution/aggregation network 5 is illustrated in FIG. 17. Initially, we consider a single transmit channel and a single receive channel. Later it will become clear that the case of multiple channels is a straightforward extension of this case. The single transmit and receive networks 5 (both represented by the same block in the figure, as per previous convention for abridged representation) are assumed identical or with electrical lengths in known mutual ratios. This is a reasonable assumption if the two networks are implemented on the same PCB with similar layouts placed in close proximity. For example, two serial links as in FIG. 9 (one for transmit and one for receive) implemented as transmission lines placed next to each other on a PCB have almost identical electrical properties even for low-cost PCB materials.

Next to each node A, B . . . H where the Tx/Rx Modules connect to the two networks 5 we place additional Loop-Back circuits 6d. Under the control 405 of the baseband processor 10, these circuits can loop back any signal coming from the transmit distribution network into the corresponding terminal of the receive aggregation network. The calibration process is as follows. The baseband processor 10 transmits an IF signal 401 through the transmit distribution network and successively requests a single Loop-Back circuit at a time to return this signal back through the receive aggregation network. For each roundtrip transmission, the baseband processor 10 measures the roundtrip phase and magnitude characteristics of the combined transmit/receive paths. After all roundtrip measurements are done, the baseband processor 10 compares expected and measured values and assigns portions of the measured values to each network 5 (transmit or receive) according to various criteria. For example, if simulations showed that a total roundtrip phase difference is divided into 60% for the transmit path and 40% for the receive path, the actual measured phase shift is assigned in the same proportions. Another criterion for value assignment may be derived from lab measurements of the above ratios. Once the actual characteristics of the transmit and the receive networks 5 are known, the baseband processor 10 adjusts the settings of the phase rotators 3 and gains stages 4 to equalize all paths. The case of multiple channels is similar with the additional possibility of measuring many combinations of forward and return paths.

The roundtrip calibration method of FIG. 17 relies on predicting accurately the correct division of measured roundtrip values between two independent networks (transmit and receive). The second calibration method for network 5 shown in FIG. 18, measures the transmit and receive networks independently. This method takes advantage of the fact that the architecture of the array in FIG. 8 provides a globally coherent LO signal at each Tx/Rx Module site. The circuits 6c generate local IF reference signals (at the Tx/Rx Module sites) from the globally coherent LO signals. Naturally, these local IF reference signals are also globally coherent. In one stage of this method, the IF reference signals 500 are transmitted one at a time through the aggregation network 5 to the baseband processor 10. The baseband processor measures the phase and magnitudes for each path of the aggregation network determining compensation values for the phase rotators 3 and gain stages 4 necessary to correct the differences from ideal values. In another stage of this method, the baseband processor 10 sends IF signals 501 through the distribution network 5, which are compared to the IF reference signals at the Tx/Rx Module sites by phase/magnitude comparators inside block 6c. This block then reports to the baseband processor 10 the phase/magnitude values measured so the baseband processor can eliminate the errors, again through adjustments of the phase rotators 3 and gain stages 4.

Figure 18:
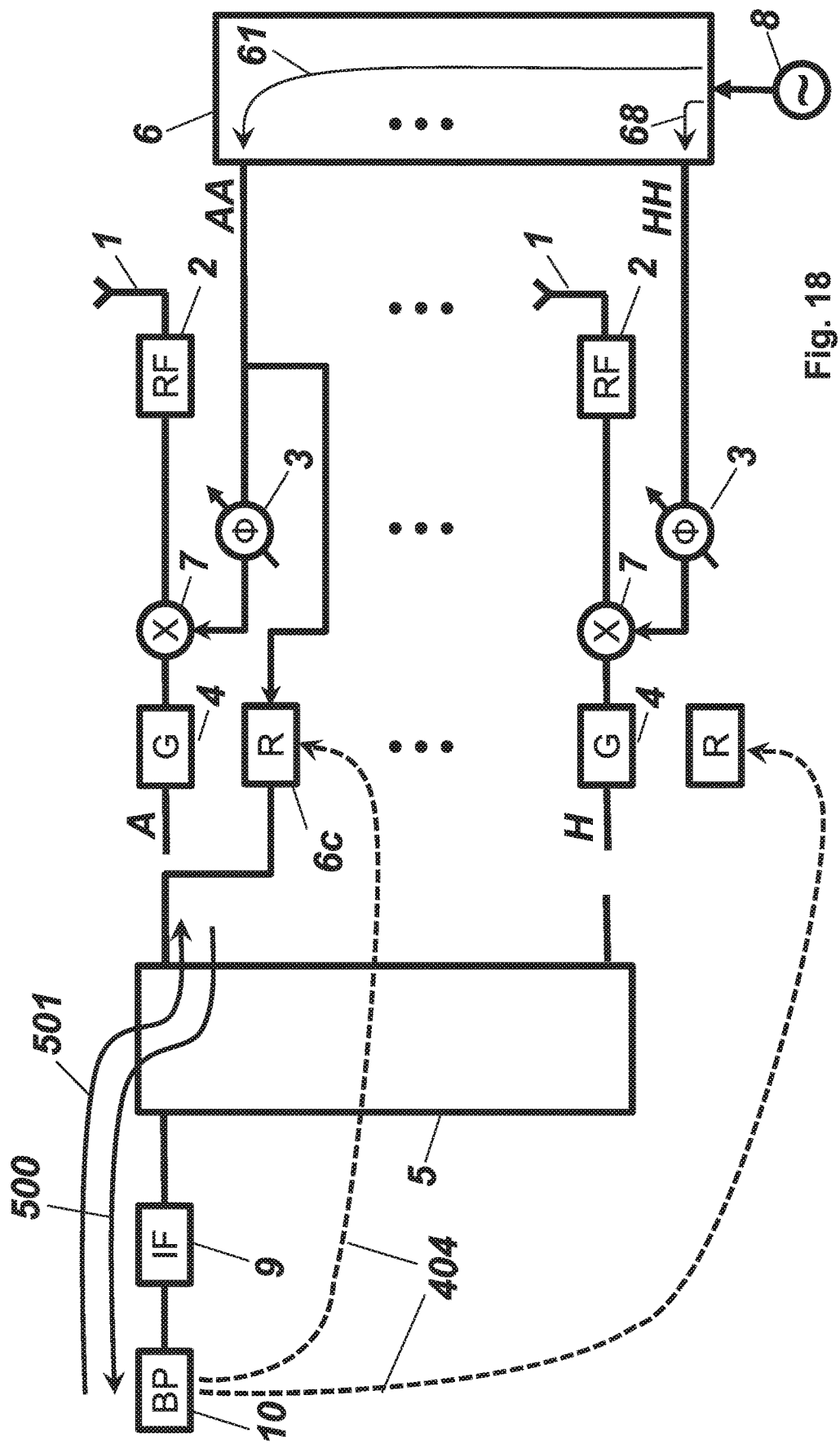
FIG. 18 depicts a second principle for the calibration of the IF distribution and IF aggregation networks of the phased array in FIG. 8.

For correct magnitude calibration using the techniques illustrated in FIG. 18, it is important to make sure the IF reference signals generated by blocks 6c have equal magnitudes. This is possible through various methods such as distributing a global DC reference voltage to all blocks 6c or using standard voltage references.

Figure 19:
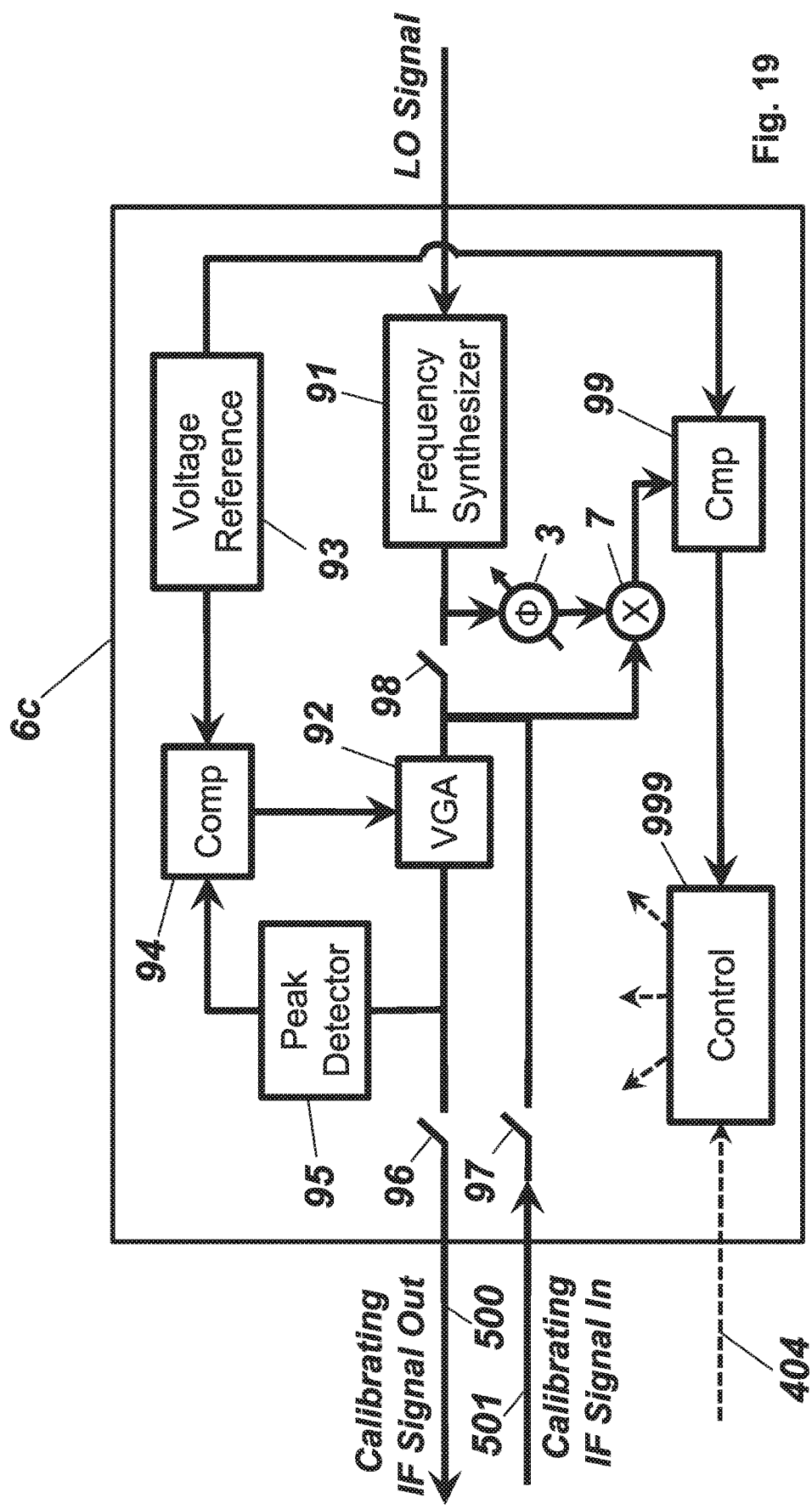
FIG. 19 depicts a simplified schematic of a possible circuit generating IF reference signals (block 6c in FIG. 18).

A typical implementation of the circuit 6c of FIG. 18 is shown in FIG. 19. The Frequency Synthesizer 91 generates globally coherent IF calibrating signals from the globally coherent LO signals. The voltage reference 93 (e.g., standard bandgap voltage references) generates DC signals of precise absolute values. The Peak Detector 95 provides a measure of the magnitude of the signals at its input, and the Variable Gain Amplifier (VGA) 92 scales the magnitude of the signal passing through it according to the control signal applied by Comparator 94. The phase rotator 3, the mixer 7, and the comparator 99 are used for phase alignment of IF signals in the Tx/Rx Module. The Controller 999 controls all blocks inside circuit 6c and communicates with the baseband processor 10 via control 404.

In one application of the method described in FIG. 18, the Controller 999 sets switches 96 and 98 on, switch 97 off and disables phase rotator 3, mixer 7 and comparator 99. The output signal of the frequency synthesizer 91 passes through the VGA 92 and it is sent out to the baseband processor 10 as a calibration signal 500. This signal is globally coherent (same phase at all Tx/RX Modules) because it is synthesized from globally coherent LO signals and it also has a known magnitude. This is guaranteed because the comparator 94 adjusts the gain of the VGA 92 until the magnitude of the signal 500 is related to a set voltage of the voltage reference 93 in a predetermined ratio (e.g. equal). As described earlier, the baseband processor 10 uses the signals 500 coming from all Tx/Rx Modules to compensate the magnitude and phase shifts occurring over the distribution networks.

In another application of the method described in FIG. 18, the Controller 999 sets switches 96 and 98 off, switch 97 on, and enables phase rotator 3, mixer 7 and comparator 99. In this case the baseband processor 10 sends calibrating signals 501 through the distribution network. The phase of the signal 501 after arriving at the Tx/Rx Module is compared to the globally coherent signal generated by the frequency synthesizer 91 using phase rotator 3, mixer 7 and comparator 99. Just like in the case of Tx/Rx Module calibration methodologies described earlier, the Controller 999 changes the phase of the phase rotator 3 until the comparator 99 outputs a predetermined DC value (preferably a maximum value or a zero value) corresponding to a known phase difference between the inputs of the mixer 7. In this way the controller 999 determines the phase of the signal 501 in relation to the globally coherent signals generated by the frequency synthesizer 91. The signal 501 is also passed through the VGA 92 for the purpose of determining its magnitude. The comparator 94 adjusts the gain of the VGA 92 until the magnitude of the signal at the output of the VGA 92 is related to a set voltage of the voltage reference 93 in a predetermined ratio. After this control loop settles, the VGA gain setting can be used to compensate the magnitude changes in signal 501 from the baseband processor 10 to the Tx/Rx Module. For example, these settings may be used for adjusting the gains of adjustable gain stages 4 in FIG. 18.

Arrays with Two-Stage Calibration

Figure 20:
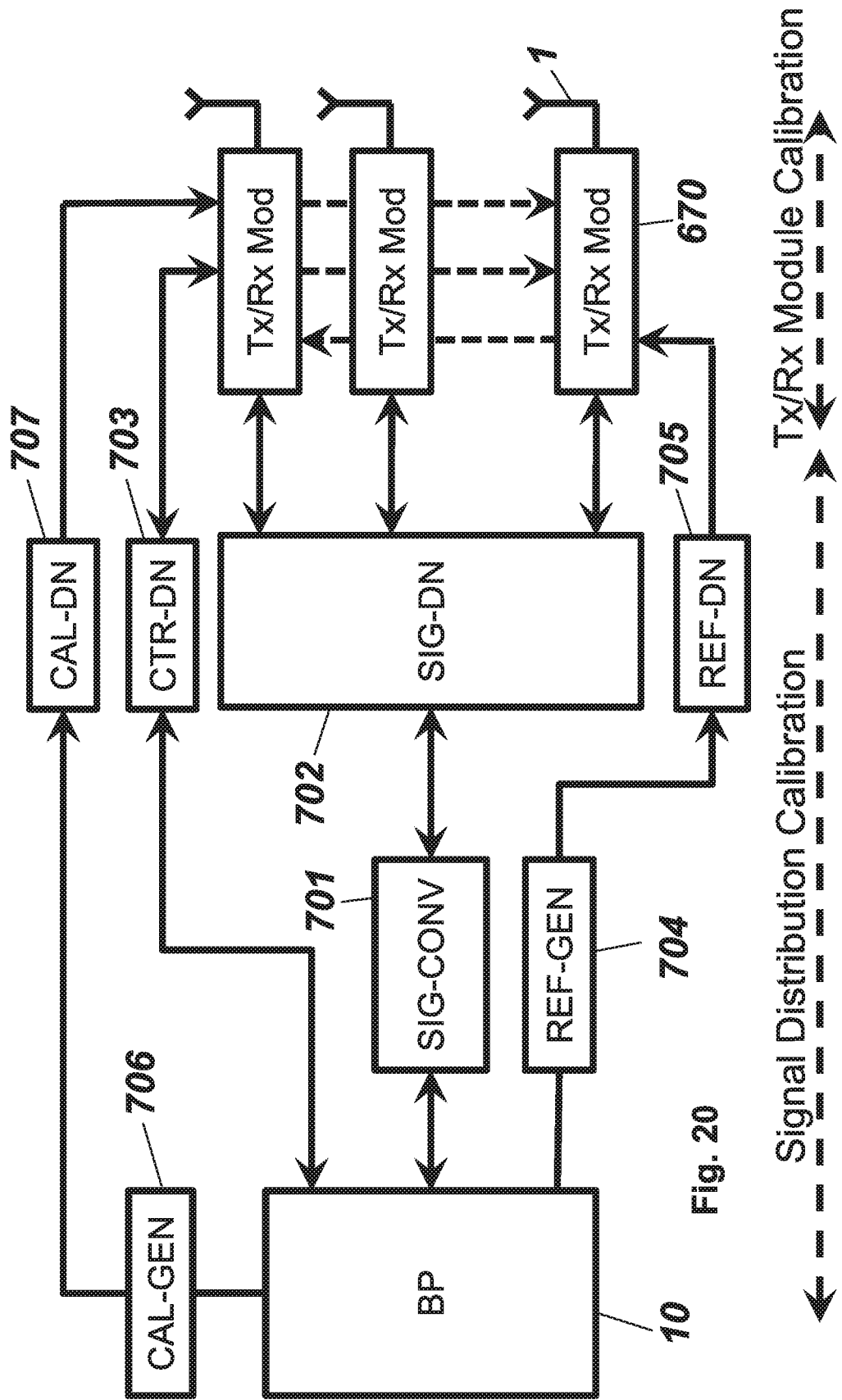
FIG. 20 depicts a system supporting the two-stage calibration method for an analog array.

The possibility to calibrate the Tx/Rx Modules and the distribution network of the array in FIG. 8 separately suggests a general array architecture suitable for a two-stage calibration method, whose advantages over the traditional end-to-end one-stage calibration will be described later. This architecture is shown in FIG. 20 including conventional array subsystems and additional subsystems. As before (FIGS. 4 and 8), we use the convention that multiple transmit and receive channels are represented in abridged form by single blocks.

The conventional array subsystems in FIG. 20 are the baseband processor 10, the signal converter 701, the signal distribution/aggregation network 702 and the control distribution network 703. The signal converter 701 is the block where digital-to-analog and analog-to-digital conversions are performed as well as up/down frequency conversion in some cases. In general, the signals exchanged between the signal converter 701 and the distribution network 702 are analog signals either at baseband or at IF or at RF. The control distribution network 703 carries control signals (usually digital) between the baseband processor and the Tx/Rx Modules 670. These modules are a combination of conventional circuits as in FIG. 3 and appropriate calibration circuits supporting the calibration methods shown in FIGS. 11, 12, 13, 14, 17 and 18.

The subsystems in FIG. 20, which are additional to the conventional array subsystems, are the reference generator 704, the calibration generator 706, the reference distribution network 705, and the calibration distribution network 707. The reference generator 704 generates a global reference signal, which is distributed to all Tx/Rx Modules via the reference distribution network 705 such that coherent replicas of this signal are available at all Tx/Rx Module sites. To this end, the reference distribution network 705 could be a corporate feed (FIG. 5) or the network shown in FIG. 10 (U.S. Pat. No. 8,611,959) or another coherent distribution network. The Tx/Rx Modules may use the coherent reference signals distributed by the network 705 (e.g., active array of FIG. 8) or may not use them (e.g., active array of FIG. 4). The calibration generator 706 generates one or several calibration signals, which are transmitted to the Tx/Rx Modules through the distribution network 707. Unlike the reference signal distributed through the network 705, the calibration signals arriving at the Tx/Rx Modules need not be mutually coherent.

The two-stage calibration of the array system in FIG. 20 operates as follows. First, the baseband processor 10 disconnects all Tx/Rx Modules from the distribution/aggregation network 702 and applies the calibration methods for this network as described in FIGS. 17 and 18. This represents the first stage of the two-stage array calibration process. In this procedure, the baseband processor may use the coherent reference signals distributed to the Tx/Rx Modules (see FIG. 18). Then, the baseband processor initiates the Tx/Rx Module calibration process, as described earlier, one module at a time or several (or all) modules simultaneously. Since the Tx/Rx Module calibration is an independent process, many Tx/Rx Modules can be calibrated at the same time. This is the second stage of the array two-stage calibration process. In this procedure, the Tx/Rx Modules use the calibration signals distributed through the network 707, as described earlier (see FIGS. 11, 12, 13, and 14).

Each stage of the two-stage calibration process described in this section addresses a different part of the array, reacting to environmental conditions differently than the other part. The Tx/Rx Modules, which are calibrated during the second stage, are generally quite sensitive to environmental conditions because they contain active circuits. However, the differences between the signal paths from the baseband processor to the Tx/Rx Modules, which are calibrated out during the first stage of the two-stage calibration process, are often invariant over environmental conditions, especially if the distribution network 702 in FIG. 20 is passive. Therefore, the first stage of the calibration process does not need to be performed but at system start up time, to compensate the fabrication variations and must be repeated only rarely to compensate slow drifts due to aging, etc. This fact is a major advantage of the two-stage calibration method compared to the end-to-end (single stage) traditional calibration method because as long as the system is running error-free up to the Tx/Rx Modules it will be possible to calibrate the rest of the array without interrupting normal operation. This is disclosed in the next section.

Two-Stage Active Array Calibration without Interrupting the Array Operation

An important advantage of an active array over a single element active system is that if one or a limited number of the array elements stops working, the impact in the overall performance of the array is minimum or even unnoticeable. For example, if one element in a phased array with 100 elements turns off, only 1% of the total transmitted power is lost (assuming equal power in all elements) and the radiation patterns remains practically unchanged. One can benefit from this fact by using the two-stage calibration process described here to calibrate an active array without interrupting its normal operation. A possible procedure follows.

At startup (boot time), the active array is calibrated fully through the first stage and the second stage, including the calibration of all Tx/Rx Modules. This ensures that the errors due to manufacturing variations and other factors are eliminated for the operating conditions existing at that moment. Then, the active array is placed in normal operation. At certain prescribed times or prompted by monitored environmental changes, etc. the Tx/Rx Modules are recalibrated (stage-two calibration repeated) one at a time while the rest of the array remain functioning. In some situations, more than one Tx/Rx Module may be calibrated at one time. In addition, in certain cases (e.g. highly variable environments or highly sensitive components) a continuous Tx/Rx Module calibration in round-robin fashion may be necessary. In this way, the array will maintain practically error free conditions over long periods.

As described so far, the two-stage calibration method maintains normal array operation during second-stage calibration but interrupts normal operation during first-stage calibration. This limitation can be removed by adding to the architecture in FIG. 20 an extra distribution network 702 and the capability to swap the existing distribution network with the extra one without stopping the normal operation of the array. The extra distribution network is calibrated off line before the swap so the system remains error free after the swap. Naturally, the distribution network taken out of the system will also be calibrated off line and will be used in the system again when the extra distribution network drifts out of calibration. This process can continue indefinitely.

Two-Stage Calibration of Digital Arrays

Figure 21:
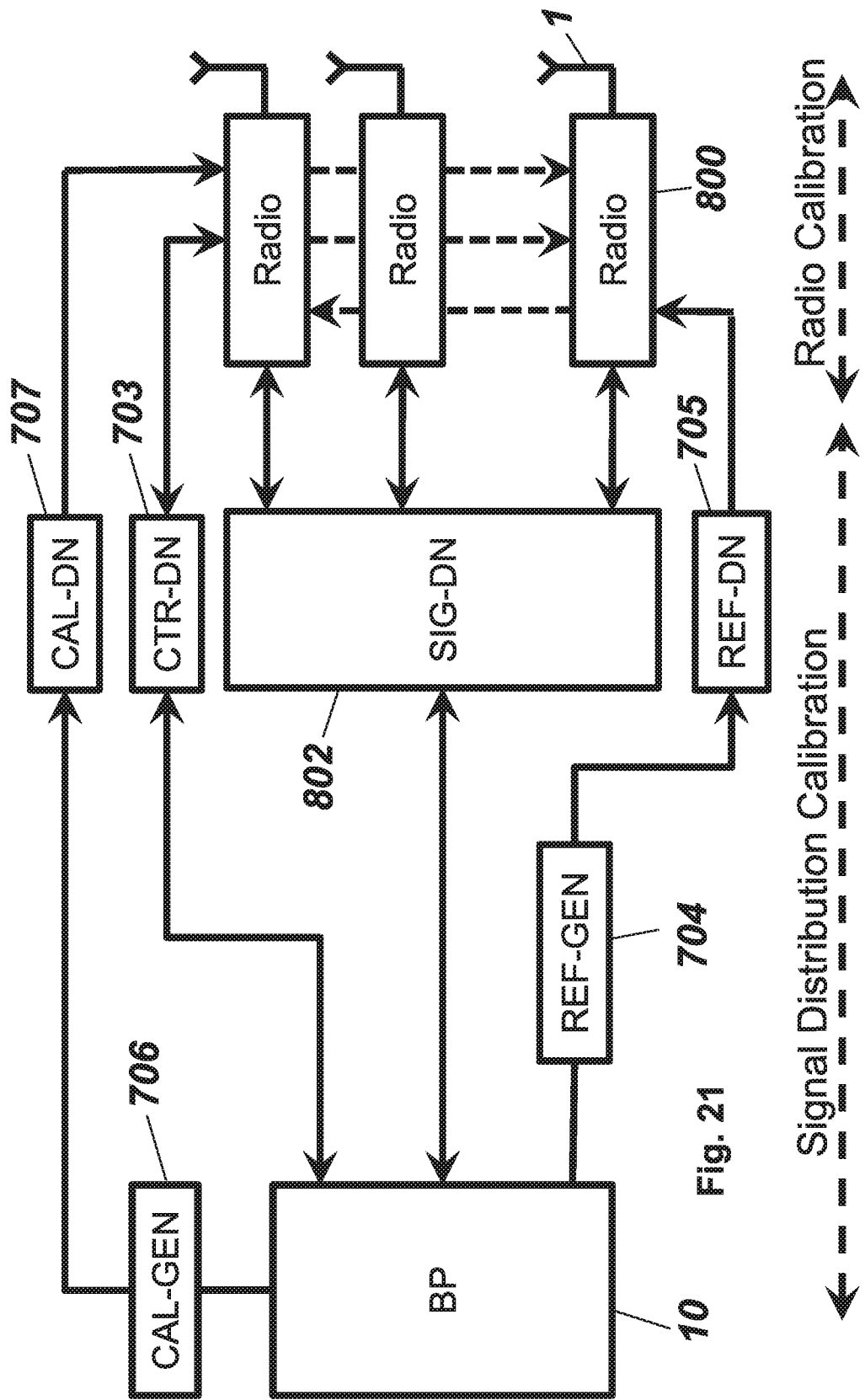
FIG. 21 depicts a system supporting the two-stage calibration method for a digital array.

The two-stage calibration method can be used as well in digital arrays. FIG. 21 shows this possibility. In this case the distribution/aggregation network 802 is digital therefore there is no need to use the signal converter block 701 from FIG. 20. In addition, the Tx/Rx Modules 670 from FIG. 20 are replaced with full radios 800, which include the Tx/Rx Module functionality and the data converter functionality (analog-to-digital and digital-to-analog converters). The reference signal generated by the reference signal generator 704 is distributed to radios 800 by the reference distribution network 705. The reference signal is used by the radios 800 for signal sampling operations (for the analog-to-digital and digital-to-analog converters) and possibly for up/down conversion operations.

The two-stage calibration for the digital array in FIG. 21 operates the same way as for the analog array in FIG. 20. The only nonessential difference is that the first-stage calibration of the distribution/aggregation network 802, is done with digital not analog signals. Naturally, there is no need for amplitude calibration of the distribution/aggregation network 802 (digital signals preserve perfect amplitude information if there are no transmission errors). However, delay errors, which give rise to phase errors, must be compensated out.

Calibration Algorithm

In the described embodiment, the baseband processor executes a program that performs the two-stage calibration operation described above. Alternatively, another processor or multiple processors may be used that are located proximate to the Tx/Rx circuits, or are located elsewhere. In the following, we will refer to the programmed entity that controls and carries out the calibration of the phased array as the processor system.

Figure 22:
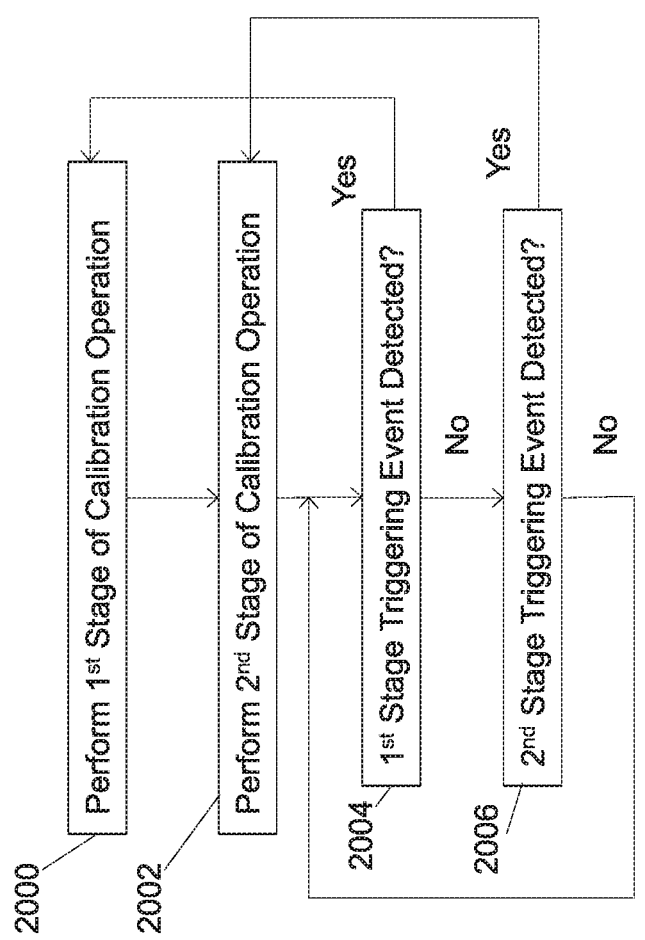
FIG. 22 is a flow chart of the main program loop.
Figure 23:
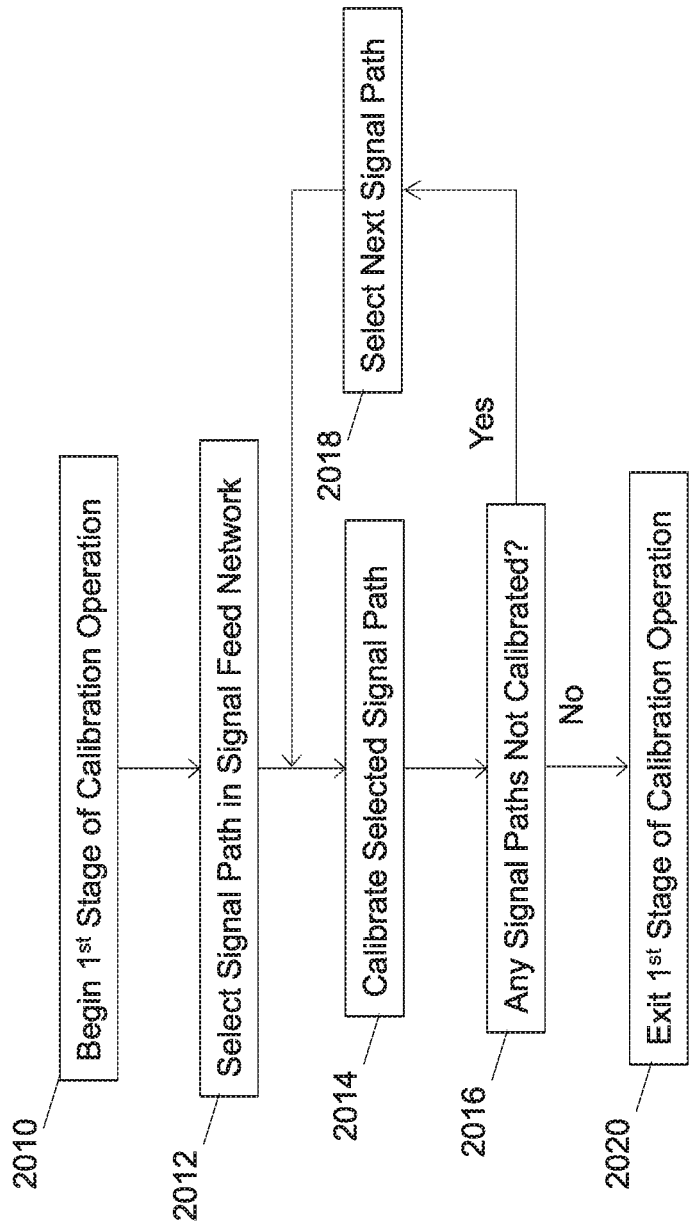
FIG. 23 is a flow chart of the subroutine that carries out the first stage of the calibration operation.
Figure 24:
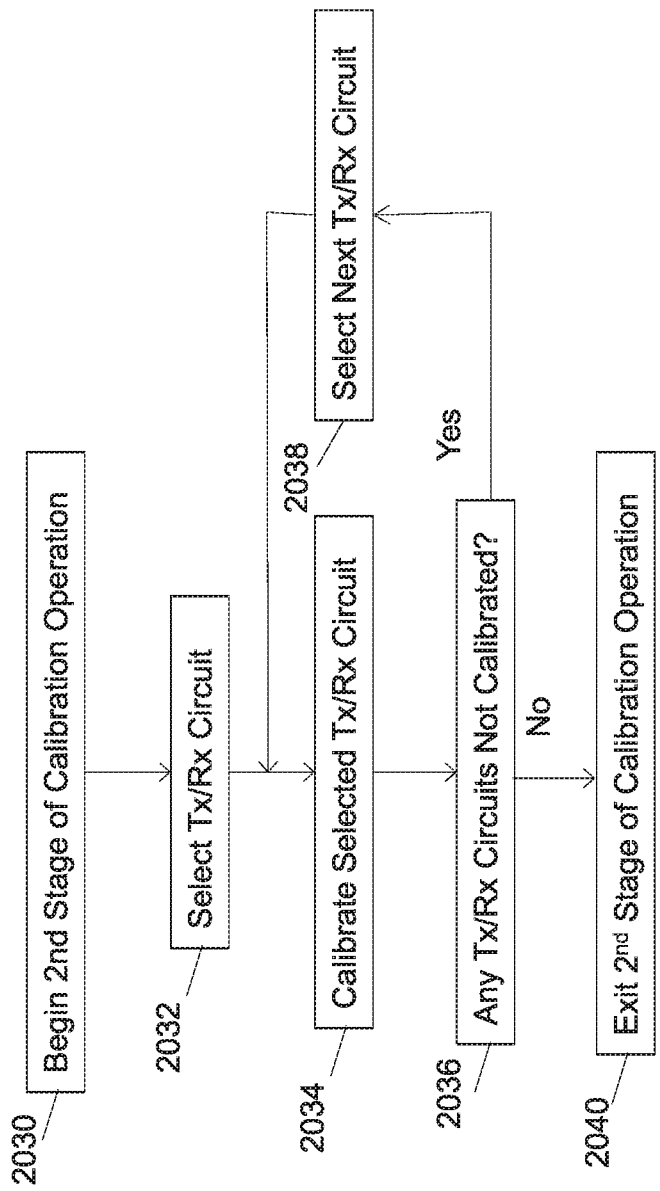
FIG. 24 is a flow chart of the subroutine that carries out the second phase of the calibration operation.

A flow chart of the operation of the processor system is shown in FIGS. 22-24 among which FIG. 22 illustrates the main program loop, FIG. 23 illustrates a subroutine that carries out the first stage of the calibration operation, and FIG. 24 illustrates a subroutine that carries out the second phase of the calibration operation. Initially, the processor system, by using the above-described circuitry in the phased array antenna system, calls the subroutine that performs the first stage of the calibration operation during which the processor system calibrates the IF distribution/aggregation network (2000) independent of the Tx/Rx circuits. During this subroutine, it disconnects the distribution/aggregation network from the Tx/Rx circuits. As a consequence, no RF signals can be received or sent via the antenna array during this stage of operation.

Referring to FIG. 23, during the subroutine which carries out first stage of the calibration operation (2010), the processor system selects a signal path(s) through the distribution/aggregation network (2012) and calibrates the selected signal path(s) (2014), using one of the above-described approaches illustrated by FIGS. 17 and 18. The calibration of the selected path(s) involves determining phase and magnitude corrections that are to be applied to the selected signal path(s). These determined values are then stored in memory local to the processor system or elsewhere.

After the selected path is calibrated, the processor system checks whether there are any remaining signal paths within the distribution/aggregation network that have not yet been calibrated (2016). If there are paths that have not yet been calibrated, the processor system cycles through those uncalibrated signal paths, calibrating each in turn (see blocks 2016, 2018, and 2014) until it has completely calibrated the distribution/aggregation network. At that point, the processor system exits this subroutine (2020) and returns to the main program loop shown in FIG. 22.

After returning to the main program loop, the processor system calls the second stage of the calibration subroutine during which it calibrates the Tx/Rx circuits independent of the distribution/aggregation network (2002). During this stage of the calibration operation, the details of which are shown in FIG. 24, the processor system selects a Tx/Rx circuit (2032) and calibrates that circuit using, for example, the approaches illustrated by FIGS. 11-14 (2034). The calibration of the selected Tx/Rx circuit involves determining phase and magnitude corrections that are to be applied to the selected Tx/Rx circuit. These determined values are stored in memory local to the processor system or elsewhere.

After the selected Tx/Rx circuit is calibrated, the processor system checks whether there are any remaining Tx/Rx circuits within the array that have not yet been calibrated (2036). If there are Tx/Rx circuits that have not yet been calibrated, the processor system cycles through those uncalibrated Tx/Rx circuits, calibrating each in turn (see blocks 2036, 2038, and 2034) until it has completely calibrated all of the Tx/Rx circuits in the array. At that point, the processor system exits (2040) the second stage calibration subroutine and returns to the main program loop shown in FIG. 22.

Next, the processor system enters a loop during which it first checks for the occurrence of any conditions that require the processor system to again perform either the first stage of the calibration operation (2004) or the second stage of the calibration operation (2006). The condition might be a command from an operator, which is more likely the approach that would be used for invoking the first stage of the calibration operation, or it might be the expiration of a timer, or it might be a detected change in an environmental condition such as, but not limited to, the temperature of the array, humidity of the environment in which it is operating, etc., or it might be a detected degradation in the performance of the array, or any combination of such considerations or factors.

As noted before, since the distribution/aggregation network is a much more stable part of the phased array system for the frequencies at which it operates, the times at which it will need to be calibrated will be infrequent. In contrast, the Tx/Rx circuits will need to be recalibrated often, especially if the array is operating in an environment in which conditions (e.g. temperature, humidity, etc.) change often. So, in practice the processor system will repeat the second stage of the calibration operation many times before again executing the first stage of the calibration operation.

Though we have described the calibration of Tx/Rx circuits as being performed one at a time and in sequence, this need not be the case. Multiple Tx/Rx circuits can be calibrated simultaneously. Recall that when a Tx/Rx circuit is being calibrated, it is removed from the active array and cannot be used to transmit or receive communication signals. In a phased array with many antenna elements, the removal of a single Tx/Rx circuit during calibration is not likely to have much adverse impact on the performance of the array. If the array is large enough, the degradation in performance resulting from removing multiple Tx/Rx circuits might prove to be acceptable. Consequently, in that case it would make sense to calibrate multiple Tx/Rx circuit simultaneously to shorten the time it takes to completely perform the second stage of the calibration process.

Other embodiments are within the following claims.

What is claimed is:

1. A phased antenna array system comprising:
a signal feed network that electrically couples a first signal line to a plurality of second signal lines;
an array of antenna elements;
a plurality of RF communication circuits, each RF communication circuit of the plurality of RF communication circuits having a first port and a second port with said first port electrically connected to a different corresponding second signal line among the plurality of second signal lines of the signal feed network and said second port electrically connected to a different corresponding antenna element within the array of antenna elements;
a plurality of calibration circuits equal in number to the plurality of RF communication circuits, each electrically connected to and for calibrating, independent of the signal feed network, a different corresponding RF communication circuit among the plurality of RF communication circuits;
a processor system programmed to execute a calibration operation during which the processor system uses each calibration circuit to perform measurements on its connected RF communication circuit and generate calibration correction data from the measurements; and
a plurality of switches controlled by the processor system for electrically connecting and disconnecting each of the plurality of RF communication circuits from its corresponding second signal line of the signal feed network.

2. The phased antenna array system of claim 1, wherein the processor system is programmed to sequence through the plurality of RF communication circuits by selecting one subset of the plurality of RF communication circuits at a time and, for each selected subset of RF communication circuits, use the calibration circuits for the selected subset of RF communication circuits to calibrate the selected RF communication circuits, until all of the plurality of RF communication circuits are calibrated, and wherein each of the selected subsets includes at least one but less than all of the plurality of RF communication circuits.

3. The phased antenna array system of claim 1, wherein the processor system is programmed to sequence through all of the plurality of RF communication circuits by selecting one of the plurality of RF communication circuits at a time and, for that selected RF communication circuit, use the calibration circuit for that selected RF communication circuit to calibrate that selected RF communication circuit, until all of the plurality of RF communication circuits are calibrated.

4. The phased antenna array system of claim 1, wherein the processor system is programmed to cause the switches to electrically disconnect each RF communication circuit of the plurality of RF communication circuit from its corresponding second signal line of the signal feed network when that RF communication circuit is being calibrated.

5. The phased antenna array system of claim 1, wherein each RF communication circuit of the plurality of RF communication circuits comprises:
    an RF mixer;
    RF front end circuitry electrically connected to the antenna element;
    phase adjusting circuitry for adjusting phase of a signal passing through that RF communication circuit;
    a communication signal line for carrying a communication signal between an external signaling network and that RF communication circuit; and
    an LO signal line for receiving a local oscillator (LO) signal for the RF mixer.

6. A phased antenna array system of claim 1, comprising:
    a signal feed network that electrically couples a first signal line to a plurality of second signal lines;
    an array of antenna elements;
    a plurality of RF communication circuits, each RF communication circuit of the plurality of RF communication circuits having a first port and a second port with said first port electrically connected to a different corresponding second signal line among the plurality of second signal lines of the signal feed network and said second port electrically connected to a different corresponding antenna element within the array of antenna elements; and
    a plurality of calibration circuits equal in number to the plurality of RF communication circuits, each electrically connected to and for calibrating, independent of the signal feed network, a different corresponding RF communication circuit among the plurality of RF communication circuits, wherein each calibration circuit among the plurality of calibration circuits comprises:
    a reference signal output line for introducing a reference signal into the RF communication circuit connected to that calibration circuit;
    a monitoring line for receiving from the RF communication circuit connected to that calibration circuit an output signal resulting from the reference signal introduced into that RF communication circuit; and
    a phase calibrating circuit for generating a phase correction for that RF communication circuit, wherein the phase correction for that calibration circuit is derived from the reference and output signals for that calibration circuit.

7. The phased antenna array system of claim 6, further comprising a plurality of switches, each of which is associated with a different RF communication circuit among the plurality of RF communication circuits and each of which is for electrically connecting and disconnecting its associated RF communication circuit from the corresponding second signal line to which that RF communication circuit is electrically connected.

8. The phased antenna array system of claim 7, further comprising a processor system programmed to execute a calibration operation during which the processor system uses each calibration circuit to perform measurements on its connected RF communication circuit and generate calibration correction data from the measurements.

9. The phased antenna array system of claim 8, wherein the plurality of switches is controlled by the processor system for electrically connecting and disconnecting each of the plurality of RF communication circuits from its corresponding second signal line of the signal feed network.

10. The phased antenna array system of claim 8, wherein the processor system is programmed to sequence through the plurality of RF communication circuits by selecting one subset of the plurality of RF communication circuits at a time and, for each selected subset of RF communication circuits, use the calibration circuits for the selected subset of RF communication circuits to calibrate the selected RF communication circuits, until all of the plurality of RF communication circuits are calibrated, and wherein each of the selected subsets includes at least one but less than all of the plurality of RF communication circuits.

11. The phased antenna array system of claim 8, wherein the processor system is programmed to sequence through all of the plurality of RF communication circuits by selecting one of the plurality of RF communication circuits at a time and, for that selected RF communication circuit, use the calibration circuit for that selected RF communication circuit to calibrate that selected RF communication circuit, until all of the plurality of RF communication circuits are calibrated.

12. The phased antenna array system of claim 6, wherein each calibration circuit among the plurality of calibration circuits further comprises:
    a magnitude calibrating circuit for generating a magnitude correction for that RF communication circuit, wherein the magnitude correction for that calibration circuit is derived from the reference and output signals for that calibration circuit.

13. A phased antenna array system comprising:
    a signal feed network that electrically couples a first signal line to a plurality of second signal lines;
    an array of antenna elements;
    a plurality of RF communication circuits, each RF communication circuit of the plurality of RF communication circuits having a first port and a second port with said first port electrically connected to a different corresponding second signal line among the plurality of second signal lines of the signal feed network and said second port electrically connected to a different corresponding antenna element within the array of antenna elements; and a plurality of calibration circuits equal in number to the plurality of RF communication circuits, each electrically connected to and for calibrating, independent of the signal feed network, a different corresponding RF communication circuit among the plurality of RF communication circuits, wherein each calibration circuit among the plurality of calibration circuits comprises:

a reference signal output line for introducing a reference signal into the RF communication circuit connected to that calibration circuit;

a monitoring line for receiving from the RF communication circuit connected to that calibration circuit an output signal resulting from the reference signal introduced into that RF communication circuit; and a magnitude calibrating circuit for generating a magnitude correction for that RF communication circuit, wherein the magnitude correction for that calibration circuit is derived from the reference and output signals for that calibration circuit.

14. The phased antenna array system of claim 13, further comprising a plurality of switches, each of which is associated with a different RF communication circuit among the plurality of RF communication circuits and each of which is for electrically connecting and disconnecting its associated RF communication circuit from the corresponding second signal line to which that RF communication circuit is electrically connected.

15. The phased antenna array system of claim 14, further comprising a processor system programmed to execute a calibration operation during which the processor system uses each calibration circuit to perform measurements on its connected RF communication circuit and generate calibration correction data from the measurements.

16. The phased antenna array system of claim 15, wherein the processor system is programmed to cause the switches to electrically disconnect each RF communication circuit of the plurality of RF communication circuit from its corresponding second signal line of the signal feed network when that RF communication circuit is being calibrated.

17. The phased antenna array system of claim 14, wherein the processor system is programmed to sequence through the plurality of RF communication circuits by selecting one subset of the plurality of RF communication circuits at a time and, for each selected subset of RF communication circuits, use the calibration circuits for the selected subset of RF communication circuits to calibrate the selected RF communication circuits, until all of the plurality of RF communication circuits are calibrated, and wherein each of the selected subsets includes at least one but less than all of the plurality of RF communication circuits.

18. The phased antenna array system of claim 14, wherein the processor system is programmed to sequence through all of the plurality of RF communication circuits by selecting one of the plurality of RF communication circuits at a time and, for that selected RF communication circuit, use the calibration circuit for that selected RF communication circuit to calibrate that selected RF communication circuit, until all of the plurality of RF communication circuits are calibrated.

* * * * *